(12) United States Patent
Wang et al.

(10) Patent No.: US 7,343,735 B2
(45) Date of Patent: Mar. 18, 2008

(54) APPARATUS AND METHOD FOR REGENERATING AN EXHAUST GAS AFTERTREATMENT COMPONENT OF AN INTERNAL COMBUSTION ENGINE

(75) Inventors: Yue Yun Wang, Columbus, IN (US); Jerilyn Tsai, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 36 days.

(21) Appl. No.: 11/119,721

(22) Filed: May 2, 2005

(65) Prior Publication Data
US 2006/0242950 A1 Nov. 2, 2006

(51) Int. Cl.
*F01N 3/00* (2006.01)
*F01N 3/02* (2006.01)

(52) U.S. Cl. .............. 60/286; 60/295; 60/297; 60/311

(58) Field of Classification Search .......... 60/297, 60/311, 286, 295
See application file for complete search history.

(56) References Cited

U.S. PATENT DOCUMENTS

| | | | |
|---|---|---|---|
| 5,287,698 A * | 2/1994 | Shinzawa et al. ........... 60/286 |
| 6,082,100 A | 7/2000 | Boegner et al. | |
| 6,082,325 A | 7/2000 | Digeser et al. | |
| 6,109,025 A * | 8/2000 | Murata et al. ........... 60/297 |
| 6,269,791 B1 * | 8/2001 | Tanaka et al. ........... 123/300 |
| 6,412,276 B1 | 7/2002 | Salvat et al. | |
| 6,594,990 B2 | 7/2003 | Kuenstler et al. | |
| 6,615,580 B1 | 9/2003 | Khair et al. | |
| 6,644,020 B2 | 11/2003 | Kuenstler et al. | |
| 6,666,020 B2 | 12/2003 | Tonetti et al. | |
| 6,691,509 B2 | 2/2004 | Hoffman et al. | |
| 6,708,487 B2 | 3/2004 | Morimoto et al. | |
| 6,718,757 B2 | 4/2004 | Khair et al. | |
| 6,851,258 B2 * | 2/2005 | Kawashima et al. ........ 60/311 |
| 6,901,746 B2 * | 6/2005 | Nishiyama et al. ......... 60/285 |
| 6,951,100 B2 * | 10/2005 | Kuboshima et al. ........ 60/311 |
| 6,966,179 B2 * | 11/2005 | Onodera et al. ........... 60/295 |
| 7,021,045 B2 * | 4/2006 | Yomogida et al. ......... 60/285 |
| 7,055,309 B2 * | 6/2006 | Plote et al. .............. 60/277 |
| 2002/0073696 A1 | 6/2002 | Kuenstler et al. | |
| 2002/0104312 A1 | 8/2002 | Hoffman et al. | |
| 2002/0194844 A1 | 12/2002 | Shirantani et al. | |
| 2003/0033800 A1 | 2/2003 | Tonettie et al. | |
| 2003/0056498 A1 | 3/2003 | Kuenstler et al. | |
| 2003/0074893 A1 | 4/2003 | Webb et al. | |
| 2003/0106309 A1 | 6/2003 | Morimoto et al. | |
| 2003/0140621 A1 | 7/2003 | Khair et al. | |
| 2003/0217549 A1 | 11/2003 | Watanabe et al. | |
| 2003/0221423 A1 | 12/2003 | Kosaka et al. | |
| 2003/0230077 A1 | 12/2003 | Kuboshima et al. | |

(Continued)

*Primary Examiner*—Thomas Denion
*Assistant Examiner*—Loren Edwards
(74) *Attorney, Agent, or Firm*—Barnes & Thornburg LLP; J. Bruce Schelkopf

(57) ABSTRACT

A system is provided for regenerating an exhaust gas aftertreatment component of an internal combustion engine. The system is operable to determine an output torque of the engine, and to supply a single quantity of fuel to the engine after combustion of a main quantity of fuel if the output torque is greater than a torque threshold, and to otherwise supply a first quantity of fuel to the engine near an end of combustion of the main quantity of fuel followed by supplying a second quantity of fuel after combustion of the main quantity of fuel.

25 Claims, 12 Drawing Sheets

U.S. PATENT DOCUMENTS

| | | |
|---|---|---|
| 2004/0035101 A1 | 2/2004 | Imai et al. |
| 2004/0045278 A1 | 3/2004 | Pott |
| 2004/0055285 A1 | 3/2004 | Rohr et al. |
| 2004/0065078 A1 | 4/2004 | Schafer-Sindlinger et al. |
| 2004/0083724 A1 | 5/2004 | Nakatani |
| 2004/0128987 A1* | 7/2004 | Kuboshima et al. .......... 60/295 |
| 2004/0139738 A1* | 7/2004 | Kuboshima et al. .......... 60/288 |
| 2006/0101812 A1* | 5/2006 | Havlena et al. ................ 60/295 |

* cited by examiner

APPARATUS AND METHOD FOR REGENERATING AN EXHAUST GAS AFTERTREATMENT COMPONENT OF AN INTERNAL COMBUSTION ENGINE

FIELD OF THE INVENTION

The present invention relates generally to exhaust gas aftertreatment components for internal combustion engines, and more specifically to techniques for regenerating such exhaust gas aftertreatment components.

BACKGROUND

Exhaust gas aftertreatment systems for internal combustion engines may typically include one or more aftertreatment components configured to process the exhaust gas in a manner that removes one or more undesirable constituents from the exhaust gas. With some such aftertreatment components, it may be desirable to periodically or non-periodically regenerate the component in a manner that reduces the amount of constituents collected therein.

SUMMARY

The present invention may comprise one or more of the features recited in the attached claims, and/or one or more of the following features and combinations thereof. A method for regenerating an exhaust gas aftertreatment component of an internal combustion engine may comprise determining an output torque of the engine and controlling post-injection fueling of the engine as a function of the output torque. For example, the method may include supplying a single quantity of fuel to the engine after combustion of a main quantity of fuel if the output torque is greater than a torque threshold, and otherwise supplying a first quantity of fuel to the engine near an end of combustion of the main quantity of fuel followed by supplying-a second quantity of fuel after combustion of the main quantity of fuel.

The method may further include determining a temperature associated with the aftertreatment component, determining a fuel adjustment value as a function of the temperature associated with the aftertreatment component and a target regeneration temperature for the aftertreatment component, and adjusting the single quantity of fuel by the fuel adjustment value if the output torque is greater than the torque threshold, and otherwise adjusting at least the second quantity of fuel by the fuel adjustment value.

The method may further include determining an oxygen concentration of exhaust gas flowing through the aftertreatment component, determining a temperature adjustment value as a function of the oxygen concentration and a target oxygen concentration value, and adjusting the target regeneration temperature by the temperature adjustment value.

Adjusting at least the second quantity of fuel may include adjusting the second quantity of fuel by the fuel adjustment value if the fuel adjustment value does not exceed a maximum fuel adjustment value, and adjusting the second quantity of fuel by the maximum fuel adjustment value and adjusting the first quantity of fuel by a difference between the fuel adjustment value and a maximum fuel adjustment value if the fuel adjustment value exceeds the maximum fuel adjustment value.

Determining a temperature associated with the aftertreatment component may include determining an operating temperature of the aftertreatment component. Determining a temperature associated with the aftertreatment component may alternatively include determining a temperature of exhaust gas entering the aftertreatment component.

The method may further include determining a pressure difference across the aftertreatment component, determining a volumetric flow rate of exhaust gas through the aftertreatment component, and determining the target regeneration temperature as a function of the pressure difference and the volumetric flow rate. Determining a volumetric flow rate may include determining a mass flow rate of fresh air supplied to the engine, determining a flow rate of fuel supplied to the engine, determining a temperature of exhaust gas supplied to the aftertreatment component, determining ambient pressure, and computing the volumetric flow rate as a function of the pressure difference, the mass flow rate of fresh air, the flow rate of fuel, the temperature of exhaust gas supplied to the aftertreatment filter and the ambient pressure.

Determining an output torque of the engine may include determining a flow rate of fuel supplied to the engine, determining a rotational speed of the engine, and computing the output torque of the engine as a function of the flow rate of fuel supplied to the engine and the rotational speed of the engine. Determining an output torque of the engine may further include determining engine load as a function of the flow rate of fuel supplied to the engine, wherein computing the output torque of the engine may include computing the output torque of the engine as a function of the engine load and the rotational speed of the engine.

The engine may include an intake manifold, an exhaust manifold and an exhaust gas recirculation conduit fluidly coupled between the intake and exhaust manifolds. The method may further include inhibiting exhaust gas flow through the exhaust gas recirculation conduit before supplying either of the single quantity of fuel and the first and second quantities of fuel to the engine.

The engine may include an intake conduit fluidly coupled between ambient and an intake manifold. The method may further include controlling air flow through the intake conduit before supplying either of the single quantity of fuel and the first and second quantities of fuel to the engine. The method may further include determining a flow rate of fuel supplied to the engine, and determining a rotational speed of the engine. Controlling air flow through the intake conduit may include reducing air flow through the intake conduit as a function of the flow rate of fuel supplied to the engine and the rotational speed of the engine.

The method may further include retarding a start-of-injection of fuel into the engine if the output torque is equal to a peak output torque value prior to supplying either of the single quantity of fuel and the first and second quantities of fuel to the engine.

The method may further include determining a temperature of exhaust gas entering the aftertreatment component, and determining the output torque of the engine and supplying either of the single quantity of fuel and the first and second quantities of fuel to the engine only if the temperature of the exhaust gas entering the aftertreatment component is greater than a threshold temperature. If the temperature of the exhaust gas entering the aftertreatment component is not greater than the threshold temperature, the method may further include both of reducing a flow rate of the exhaust gas, and supplying an auxiliary quantity of fuel to the engine near the end of combustion of the main quantity of fuel to increase the temperature of the exhaust gas entering the aftertreatment component.

A method for regenerating an exhaust gas aftertreatment component of an internal combustion engine may comprise determining first and second quantities of fuel to be supplied to the engine, determining a fuel adjustment value, determining final first and second fuel quantities as functions of the first and second quantities of fuel respectively and of the fuel adjustment value, and supplying fuel to the engine in the amount of the final first and second fuel quantities as post-injection fueling quantities. Determining a final second fuel quantity may include determining the final second fuel quantity as the second quantity of fuel modified by the fuel adjustment value if the fuel adjustment value does not exceed a maximum adjustment value, and otherwise determining the final second fuel quantity as the maximum fuel adjustment value. Determining a final first fuel quantity may include determining the final first quantity of fuel as the first quantity of fuel if the fuel adjustment value does not exceed the maximum adjustment value, and otherwise determining the final first fuel quantity as the first quantity of fuel modified by a difference between the fuel adjustment value and the maximum adjustment value. Supplying fuel to the engine in the amount of the final first and second fuel quantities as post-injection fueling quantities may include supplying the first final fuel quantity to the engine near an end of combustion of a main quantity of fuel followed by supplying the second fuel quantity to the engine after combustion of the main quantity of fuel. The first quantity of fuel may be zero.

The method may further include determining a flow rate of fuel to the engine, and determining a rotational speed of the engine. Determining the first and second quantities of fuel may then include determining the first quantity of fuel as a first function of the flow rate of fuel and the rotational speed of the engine and determining the second quantity of fuel as a second function of the flow rate of fuel and the rotational speed of the engine.

Determining a fuel adjustment value may include determining a temperature associated with the aftertreatment component, and determining the fuel adjustment value as a function of the temperature associated with the aftertreatment component and a target regeneration temperature. Determining a temperature associated with the aftertreatment component may include determining an operating temperature of the aftertreatment component. Determining an operating temperature of the aftertreatment component may include determining a temperature of exhaust gas entering the aftertreatment component, determining a temperature of exhaust gas exiting the aftertreatment component, and determining the operating temperature of the aftertreatment component as a function of the temperature of exhaust gas entering the aftertreatment component and the temperature of exhaust gas exiting the aftertreatment component. Alternatively, determining a temperature associated with the aftertreatment component may include determining a temperature of exhaust gas entering the aftertreatment component.

The method may further include determining an oxygen concentration of exhaust gas flowing through the aftertreatment component, determining a temperature adjustment value as a function of the oxygen concentration and a target oxygen concentration value, and modifying the target regeneration temperature by the temperature adjustment value.

The method may further include determining a pressure difference across the aftertreatment component, determining a volumetric flow rate of exhaust gas through the aftertreatment component, and determining the target regeneration temperature as a function of the pressure difference and the volumetric flow rate. Determining a volumetric flow rate may include determining a mass flow rate of fresh air supplied to the engine, determining a flow rate of fuel supplied to the engine, determining a temperature of exhaust gas supplied to the aftertreatment component, determining ambient pressure, and computing the volumetric flow rate as a function of the pressure difference, the mass flow rate of fresh air, the flow rate of fuel, the temperature of exhaust gas supplied to the aftertreatment filter and the ambient pressure.

The engine may include an intake manifold, an exhaust manifold and an exhaust gas recirculation conduit fluidly coupled between the intake and exhaust manifolds. The method may further include inhibiting exhaust gas flow through the exhaust gas recirculation conduit before supplying either of the first and second final fuel quantities to the engine.

The engine may include an intake conduit fluidly coupled between ambient and an intake manifold. The method may further include controlling air flow through the intake conduit before supplying either of the first and second final fuel quantities to the engine. The method may further include determining a flow rate of fuel supplied to the engine, and determining a rotational speed of the engine. Controlling air flow through the intake conduit may include reducing air flow through the intake conduit as a function of the flow rate of fuel supplied to the engine and the rotational speed of the engine.

The method may further include determining an output torque of the engine, and retarding a start-of-injection of fuel into the engine if the output torque is equal to a peak output torque value prior to supplying either of the first and second final fuel quantities to the engine.

The method may further include determining a flow rate of fuel supplied to the engine, determining a rotational speed of the engine, determining a start-of-injection crank angle relative to a reference crank angle as a function of the flow rate of fuel and the rotational speed of the engine, and supplying the first final fuel quantity to the engine at the start-of-injection crank angle.

The method may further include determining a flow rate of fuel supplied to the engine, determining a rotational speed of the engine, determining a start-of-injection crank angle relative to a reference crank angle as a function of the flow rate of fuel and the rotational speed of the engine, and supplying the second final fuel quantity to the engine at the start-of-injection crank angle.

The method may further include determining a flow rate of fuel supplied to the engine, determining a rotational speed of the engine, determining a first start-of-injection crank angle relative to a reference crank angle as a first function of the flow rate of fuel and the rotational speed of the engine, determining a second start-of-injection crank angle relative to the reference crank angle as a second function of the flow rate of fuel and the rotational speed of the engine, determining a main start-of-injection crank angle relative to the reference crank angle as a third function of the flow rate of fuel and the rotational speed of the engine, and supplying the main quantity of fuel at the main start-of-injection crank angle, followed by supplying the first quantity of fuel at the first start-of-injection crank angle, followed by supplying the second quantity of fuel at the second start-of-injection crank angle.

A method for regenerating an exhaust gas aftertreatment component of an internal combustion engine may comprise determining an oxygen concentration of exhaust gas flowing through the aftertreatment component, determining a temperature adjustment value as a function of the oxygen concentration and a target oxygen concentration value, modifying a target regeneration temperature for the aftertreatment component by the temperature adjustment value, determining at least one fuel quantity, modifying the at least one fuel quantity as a function of the modified target regeneration temperature, and supplying the modified at least one fuel quantity to the engine near an end of or after combustion of a main quantity of fuel.

The method may further include determining a temperature associated with the aftertreatment component. Modifying the at least one fuel quantity may include modifying the at least one fuel quantity as a function of the modified target regeneration temperature and the temperature associated with the aftertreatment component. Determining a temperature associated with the aftertreatment component may include determining an operating temperature of the aftertreatment component. Alternatively, determining a temperature associated with the aftertreatment component may include determining a temperature of exhaust gas entering the aftertreatment component.

The method may further include determining a flow rate of fuel supplied to the engine, and determining a rotational speed of the engine. Determining at least one fuel quantity may include determining the at least one fuel quantity as a function of the flow rate of fuel and the rotational speed of the engine.

The method may further include determining a pressure difference across the aftertreatment component, determining a volumetric flow rate of exhaust gas through the aftertreatment component, and determining the target regeneration temperature as a function of the pressure difference and the volumetric flow rate. Determining a volumetric flow rate may include determining a mass flow rate of fresh air supplied to the engine, determining a flow rate of fuel supplied to the engine, determining a temperature of exhaust gas supplied to the aftertreatment component, determining ambient pressure, and computing the volumetric flow rate as a function of the pressure difference, the mass flow rate of fresh air, the flow rate of fuel, the temperature of exhaust gas supplied to the aftertreatment filter and the ambient pressure.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
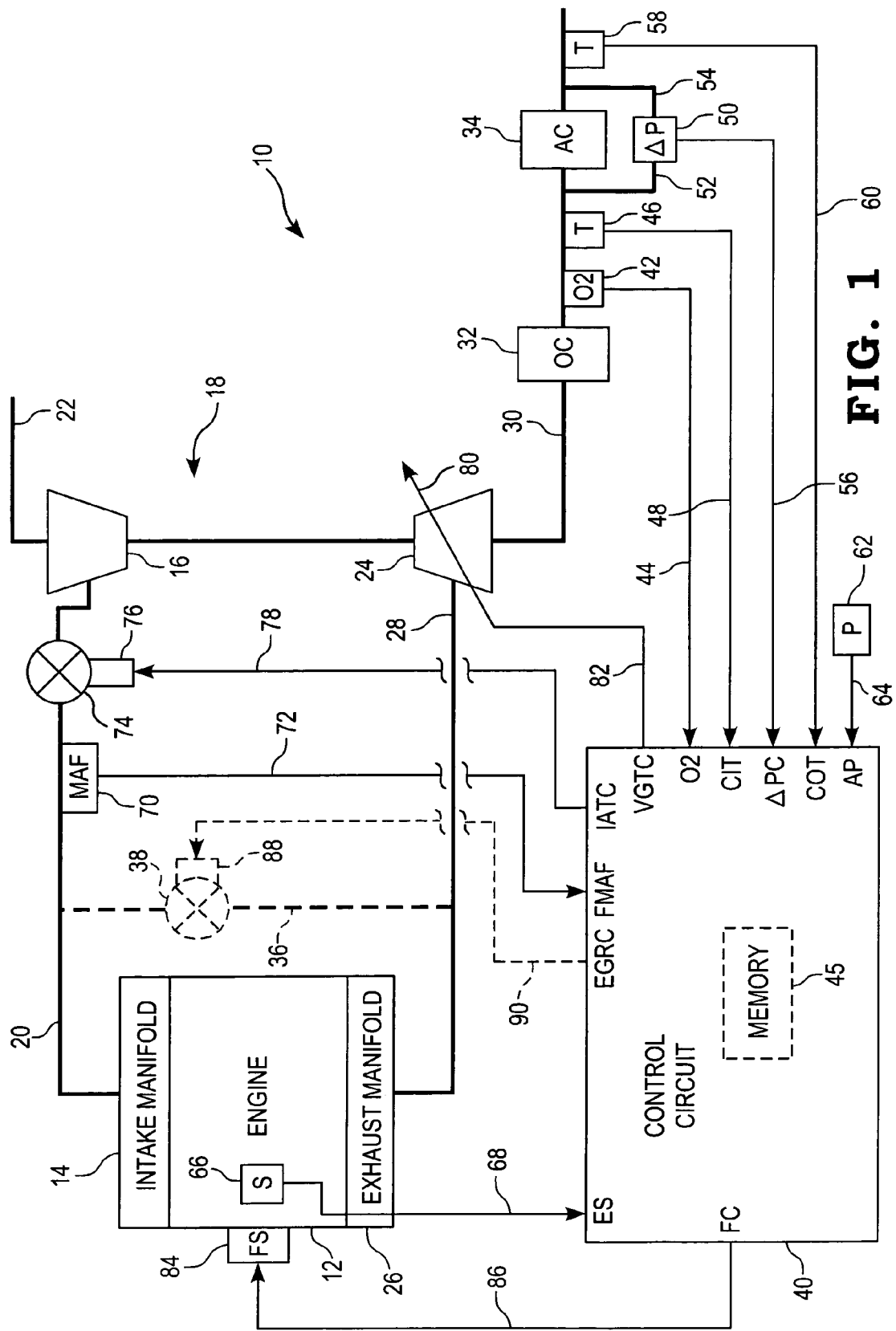
FIG. 1 is a diagram of one illustrative embodiment of a system for regenerating an aftertreatment component of an internal combustion engine.

Referring now to FIG. 1, diagram of one illustrative embodiment of a system 10 for regenerating an aftertreatment component 34 of an internal combustion engine 12 is shown. In the illustrated embodiment, the system 10 includes an internal combustion engine 12 having an intake manifold 14 fluidly coupled to a fresh air outlet of a compressor 16 of a turbocharger 18 via conduit 20. A fresh air inlet of the compressor 16 is fluidly coupled to a fresh air intake conduit 22. An intake air cooler (not shown) may optionally be disposed in-line with the intake air conduit 20 adjacent to the fresh air outlet of the compressor 16 to cool the fresh air supplied by the compressor 16. A turbine 24 of the turbocharger 18 is mechanically coupled via a rotational drive shaft to the compressor 16 in a conventional manner. An exhaust gas inlet of the turbine 24 is fluidly coupled to an exhaust manifold 26 of the engine 12 via an exhaust gas conduit 28. An exhaust gas outlet of the turbine 24 is fluidly coupled to an exhaust gas inlet of an oxidation catalyst (OC) 32 via an exhaust gas conduit 30. Alternatively or additionally, another oxidation catalyst, or so-called close-coupled catalyst (not shown), may be disposed in-line with the exhaust gas conduit 28 adjacent to the exhaust manifold 26. The oxidation catalyst 32 and/or close-coupled catalyst (not shown), in any case, includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such aftertreatment component 34 illustrated in FIG. 1, and is disposed in-line with the exhaust gas conduit 30 between the OC 32 and ambient. In the illustrated embodiment, the engine 12 is a conventional diesel engine, and the exhaust gas aftertreatment component (AC) 34 includes at least a diesel particulate filter (DPF). For purposes of this document, the exhaust aftertreatment component 34 may include more component elements in any desired order relative to the direction of exhaust gas flow, although it will in all cases include at least a particulate or soot filter.

In one embodiment, the system 10 may further include an exhaust gas recirculation (EGR) conduit 36 fluidly coupled between the exhaust gas conduit 28 and the air intake conduit 20. In this embodiment, an EGR valve 38 is disposed in-line with the EGR conduit 36, and may be controlled in a conventional manner to control the flow of exhaust gas from the exhaust gas conduit 28 to the intake manifold 14 of the engine 12. Optionally, an EGR cooler (not shown) may be disposed in-line with the EGR conduit 36, between the EGR valve 38 and the intake air conduit 20, to cool the exhaust gas flowing through the EGR conduit 36 prior to introducing the recirculated exhaust gas into the air intake conduit 20. The control concepts described herein are also applicable to non-EGR engines, and the EGR components 36 and 38 are accordingly shown in phantom in FIG. 1 to indicate that these components may or may not be included. Although the turbocharger 18 and its various components are not shown in phantom in FIG. 1, it will be understood that the control concepts described herein do not strictly require a turbocharger, and in some embodiments the turbocharger 18 may accordingly be omitted. In such cases, the air intake conduit 20 is fluidly coupled directly to the air intake conduit 22, and the exhaust gas conduit 28 is fluidly coupled directly to the exhaust gas conduit 30.

The system 10 further includes a control circuit 40 configured to control the overall operation of the engine 12 as well as any associated air handling components, such as the EGR valve 36, if included within the system 10, and other air handling components that will be described hereinafter. In one embodiment, the control circuit 40 is a microprocessor-based control circuit typically referred to as an electronic or engine control module (ECM), or electronic or engine control unit (ECU). It will be understood, however, that the control circuit 40 may generally be or include one or more general purpose or application specific control circuits arranged and operable as will be described hereinafter.

The control circuit 40 includes a number of inputs receiving sensory information relating to operation of the engine 12, one or more air handling mechanisms, and operating signals and/or values relating to operation of the *aftertreatment component 34. For example, the system 10 includes a conventional oxygen sensor 42 in fluid communication with the exhaust conduit 30 near the exhaust gas inlet of the aftertreatment component 34, and electrically connected to an oxygen inlet, O2, of the control circuit 40 via a signal path 44. The oxygen sensor 42 is operable to produce a signal on the signal path 44 that is indicative of the oxygen content of the exhaust gas entering the exhaust gas inlet of the aftertreatment component.

The system 10 further includes aftertreatment component inlet exhaust gas temperature sensor 46 in fluid communication with the exhaust gas conduit 30 near the exhaust gas inlet of the aftertreatment component 34, and electrically connected to a catalyst inlet temperature input, CIT, of the control circuit 40 via a signal path 48. The temperature sensor 46 may be a conventional sensor, and is operable to produce a temperature signal on the signal path 48 that is indicative of the temperature of exhaust gas entering the exhaust gas inlet of the aftertreatment component 34.

The system 10 further includes a delta pressure (ΔP) sensor 50 in fluid communication with a first conduit 52 fluidly coupled to the exhaust conduit 30 near the exhaust gas inlet of the aftertreatment component 34, and also in fluid communication with a second conduit 54 fluidly coupled to the exhaust conduit 30 near the exhaust gas outlet of the aftertreatment component 34. The ΔP sensor 50 is electrically connected to an aftertreatment component delta pressure input, ΔPC, of the control circuit 40 via a signal path 56. The ΔP sensor 50 may be a conventional sensor, and is operable to produce a pressure signal on the signal path 56 that is indicative of a pressure differential between the exhaust gas inlet and the exhaust gas outlet of the aftertreatment component 34.

The system 10 further includes an exhaust gas temperature sensor 58 in fluid communication with the exhaust gas conduit 30 near the exhaust gas outlet of the aftertreatment component 34, and electrically connected to a catalyst outlet temperature input, COT, of the control circuit 40 via a signal path 60. The temperature sensor 58 may be a conventional sensor, and is operable to produce a temperature signal on signal path 60 that is indicative of the temperature of the exhaust gas exiting the aftertreatment component 34.

The system 10 further includes a pressure sensor 62 in fluid communication with ambient, and electrically connected to an ambient pressure input, AP, of the control circuit 40 via a signal path 64. The pressure sensor 62 may be a conventional sensor, and is operable to produce a pressure signal on signal path 64 that is indicative of ambient pressure.

The engine 12 includes an engine speed sensor 66 electrically connected to an engine speed input, ES, of the control circuit 40 via a signal path 68. In one embodiment, the engine speed sensor 66 is a Hall-effect sensor producing a signal on signal path 68 that is indicative of engine speed and crank angle relative to a reference crank angle; e.g., top-dead-center (TDC). Alternatively, any conventional sensor may be used; e.g., variable reluctance sensor or the like, operable to produce a signal on signal path 68 that is indicative of the rotational speed of the engine 12. In such embodiments, however, another sensor or technique will typically be required to determine engine position in the form of a crank angle relative to a reference crank angle.

The system 10 further includes a mass air flow sensor 70 positioned in fluid communication with the air intake conduit 20 and electrically coupled to a fresh mass airflow input, FMAF, of the control circuit 40 via a signal path 72. In embodiments that do not include the EGR components 36 and 38, the mass airflow sensor 70 may be positioned anywhere along the air intake conduit 20 or in fluid communication with the intake manifold 14. In embodiments that do include the EGR components 36 and 38, the mass airflow sensor 70 is positioned upstream of the junction of the EGR conduit 36 and the intake air conduit 20 as illustrated in FIG. 1. In either case, the mass airflow sensor 70 is a conventional sensor operable to produce a fresh mass airflow signal on the signal path 72 that is indicative of the flow rate of fresh air through the intake air conduit 20.

The control circuit 40 further includes a number of outputs for providing control signals to one or more engine control and air handling mechanism actuators. For example, the system 10 further includes a conventional intake air throttle 74 disposed in-line with the intake air conduit 20. In embodiments that include the EGR components 36 and 38, the intake air throttle 74 is located upstream of the junction of the EGR conduit 36 and the intake air conduit 20. In embodiments that do not include the EGR components 36 and 38, the intake air throttle 74 may be located anywhere along the intake air conduit 20. In any case, the intake air throttle 74 includes an intake air throttle actuator 76 that is electrically connected to an intake air throttle command output, IATC, of the control circuit 40 via a signal path 78. The control circuit 40 is operable to control the actuator 76 in a conventional manner by providing appropriate control signals on the signal path 78 to actively control the flow of fresh air into the intake manifold 14.

The system 10 further includes a variable geometry turbocharger mechanism 80 configured to selectively control the swallowing capacity and/or efficiency of the turbine 24 and thereby control the flow rate of exhaust gas through the exhaust conduit 28 as well as the rotational speed of the turbine 24 and compressor 16. The variable geometry turbocharger mechanism 80 is electrically connected to a variable geometry turbocharger control output, VGTC, of the control circuit 40 via a signal path 82. The variable geometry turbocharger mechanism 80 may be or include a conventional variable geometry mechanism and actuator associated with the turbine 24, that is responsive to control signals provided by the control circuit 40 on the signal path 82 to correspondingly vary the swallowing capacity of the turbine 24. Alternatively or additionally, the variable geometry turbocharger mechanism 80 may be or include a conventional exhaust throttle that is responsive to control signals provided by the control circuit 40 on the signal path 82 to correspondingly control the efficiency of the turbine 24 by controlling the flow rate of exhaust gas through the exhaust gas conduits 28 and 30. It will be appreciated that the variable geometry turbocharger mechanism 80 may alternatively or additionally be or include other conventional mechanisms for controlling the swallowing capacity and/or efficiency of the turbine 24.

The system 10 further includes a conventional fuel system 84 coupled to the engine 12 and electrically connected to a fuel command output, FC, of the control circuit 40 via one or more signal paths 86. The fuel system 84 is responsive to fuel command signals provided by the control circuit 40 on the one or more signal paths 86 to supply fuel to the engine 12 in a conventional manner.

In embodiments of the system 10 that include the EGR components 36 and 38, the system 10 further includes an EGR valve actuator 88 that is electrically connected to an EGR valve command output, EGRC, of the control circuit 40 via a signal path 90. The control circuit 40 is operable to control the actuator 88 in a conventional manner by providing appropriate control signals on the signal path 90 to actively control the flow of exhaust gas through the EGR conduit 36.

Figure 2:
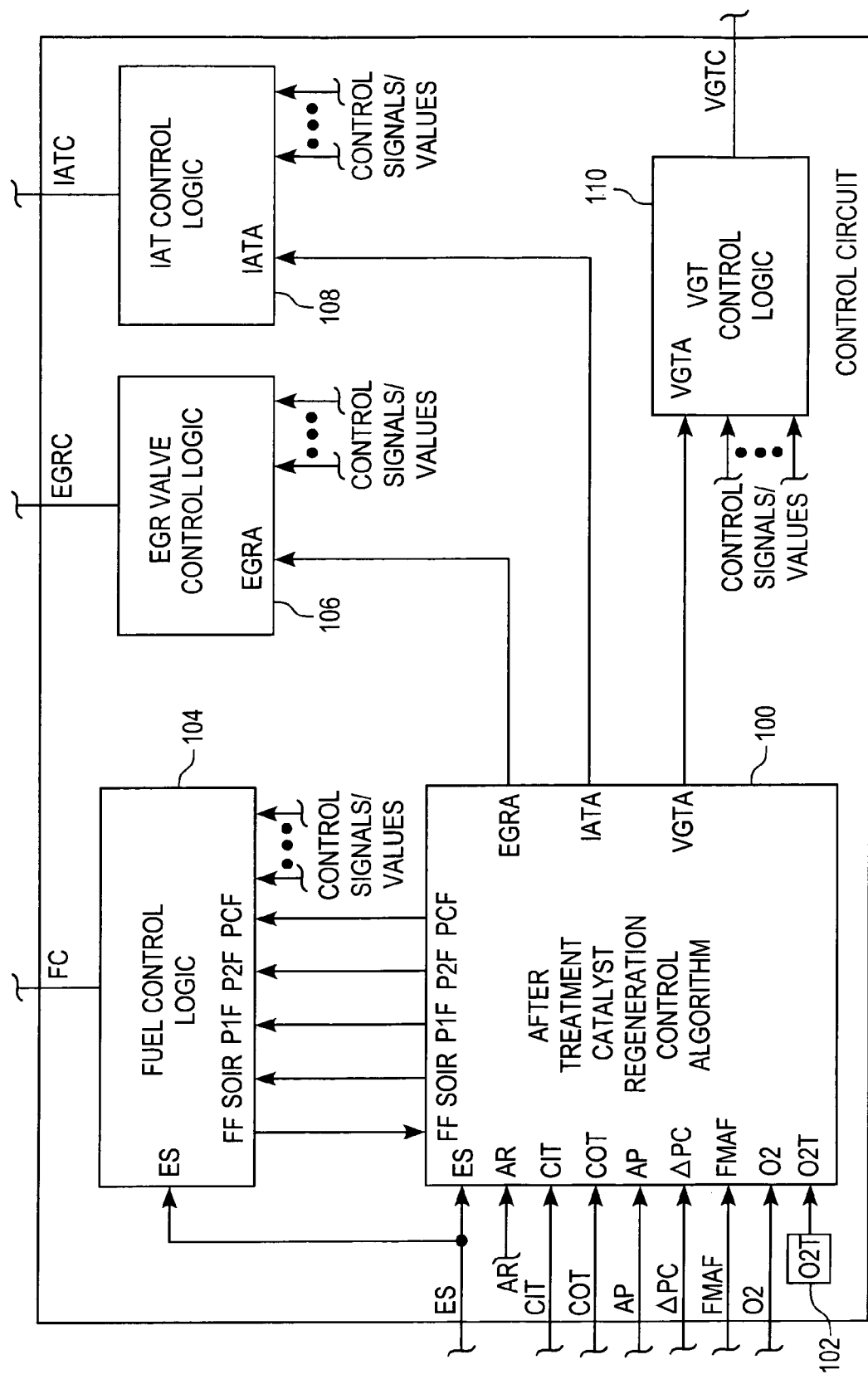
FIG. 2 is a block diagram of one illustrative embodiment of at least some of the internal features of the control circuit of FIG. 1 as they relate to regenerating the aftertreatment component.

In the illustrated embodiment, the control circuit 40 includes, or is coupled to, a memory unit 45 that stores therein a number of software algorithms executable by the control circuit 40 to control various operations of the engine 12 and associated air handling components. A number of control structures defined by one or more such software algorithms are illustrated in FIG. 2. One such control structure is an aftertreatment catalyst regeneration control algorithm 100, receiving as inputs the engine speed signal, ES, the catalyst inlet temperature signal, CIT, the catalyst outlet temperature signal, COT, the ambient pressure signal, AP, the aftertreatment component delta pressure signal, ΔPC, the fresh mass air flow signal, FMAF, the oxygen signal, O2, and a fuel flow value, FF. An oxygen target value, O2T, is stored in a memory block 102, and is also provided as an input to the algorithm 100. Additionally, the control circuit 40 is operable, pursuant to one or more other algorithms, to generate an active regeneration value, AR, which is a status indicator indicating whether the aftertreatment component 34 is, or is not, currently being actively (controllably) regenerated. For example, if the aftertreatment component 34 is being actively regenerated, AR may be a "1" or "true", and may otherwise be "0" or "false." In any case, the active regeneration value, AR, is also provided as an input to the algorithm 100. The aftertreatment catalyst regeneration control algorithm 100 is operable, as will be described in detail hereinafter, to process the foregoing input signals and values and control regeneration of the aftertreatment component 34 by producing a number of output commands. For example, the algorithm 100 includes a retarded start-of-injection output, SOIR providing a retarded start-of-injection value to a fuel control logic block 104 forming another control structure within the control circuit 40. The algorithm 100 further includes post 1 fuel, P1F, post 2 fuel, P2F, post catalyst fuel, PCF, outputs all providing corresponding post-fueling values to the fuel control logic block 104. The algorithm 100 further includes an EGR adjust output, EGRA, that provides a corresponding EGR valve command adjustment value to an EGR valve control logic block 106, an intake air throttle adjustment output, IATA, that provides a corresponding intake air throttle command adjustment value to an intake air throttle control logic block 108, and a variable geometry turbocharger adjustment output, VGTA, that provides a corresponding VGT command adjustment value to a VGT control logic block 110. Further details relating to the structure and operation of the algorithm 100 will be described in detail hereinafter.

The fuel control logic block 104 is responsive to a number of engine operating conditions, such as engine speed, ES, and a number of other control signals and/or values, to determine appropriate fueling commands in a conventional manner. The fueling commands, FC, produced by the fuel control logic block 104 include a fuel flow rate (FF) component, typically in units of $mm^3$/stroke, which corresponds to a flow rate of fuel supplied by the fuel system 84 to the engine 12, and a start-of-injection (SOI) component, typically in degrees relative to a reference crank angle, which corresponds to the timing of fuel supplied by the fuel system 84 to the engine 12 relative to a timing reference. In the illustrated embodiment, the fuel control logic block 104 is further responsive to the retarded start-of-injection value, SOIR, as well as the post-injection fuel values, P1F, P2F and PCF, produced by the aftertreatment catalyst regeneration control algorithm 100 to determine the fueling commands, FC, as will be described in greater detail hereinafter.

The EGR valve control logic block 106 is responsive to a number of control signals and/or values to determine appropriate EGR valve position commands in a conventional manner. In the illustrated embodiment, the EGR valve control logic block 106 is further responsive to the EGR valve position adjustment value, EGRA, produced by the algorithm 100 to modify the EGR valve position command, EGRC, in a conventional manner to effectuate a corresponding adjustment in the position of the EGR valve 36.

The intake air throttle control logic block 108 is likewise responsive to a number of control signals and/or values to determine appropriate intake air throttle position commands in a conventional manner. In the illustrated embodiment, the intake air throttle control logic block 108 is further responsive to the intake air throttle adjustment value, IATA, produced by the algorithm 100 to modify the intake air throttle position command, IATC, in a conventional manner to effectuate a corresponding adjustment in the position of intake air throttle 74.

The VGT control logic block 110 is also responsive to a number of control signals and/or values to determine appropriate VGT commands in a conventional manner. In the illustrated embodiment, the VGT control logic block 110 is further responsive to the VGT adjustment value, VGTA, produced by the algorithm 100 to modify the VGT command, VGTC, in a conventional manner to effectuate a corresponding adjustment in the position of the VGT mechanism 80.

Figure 3:
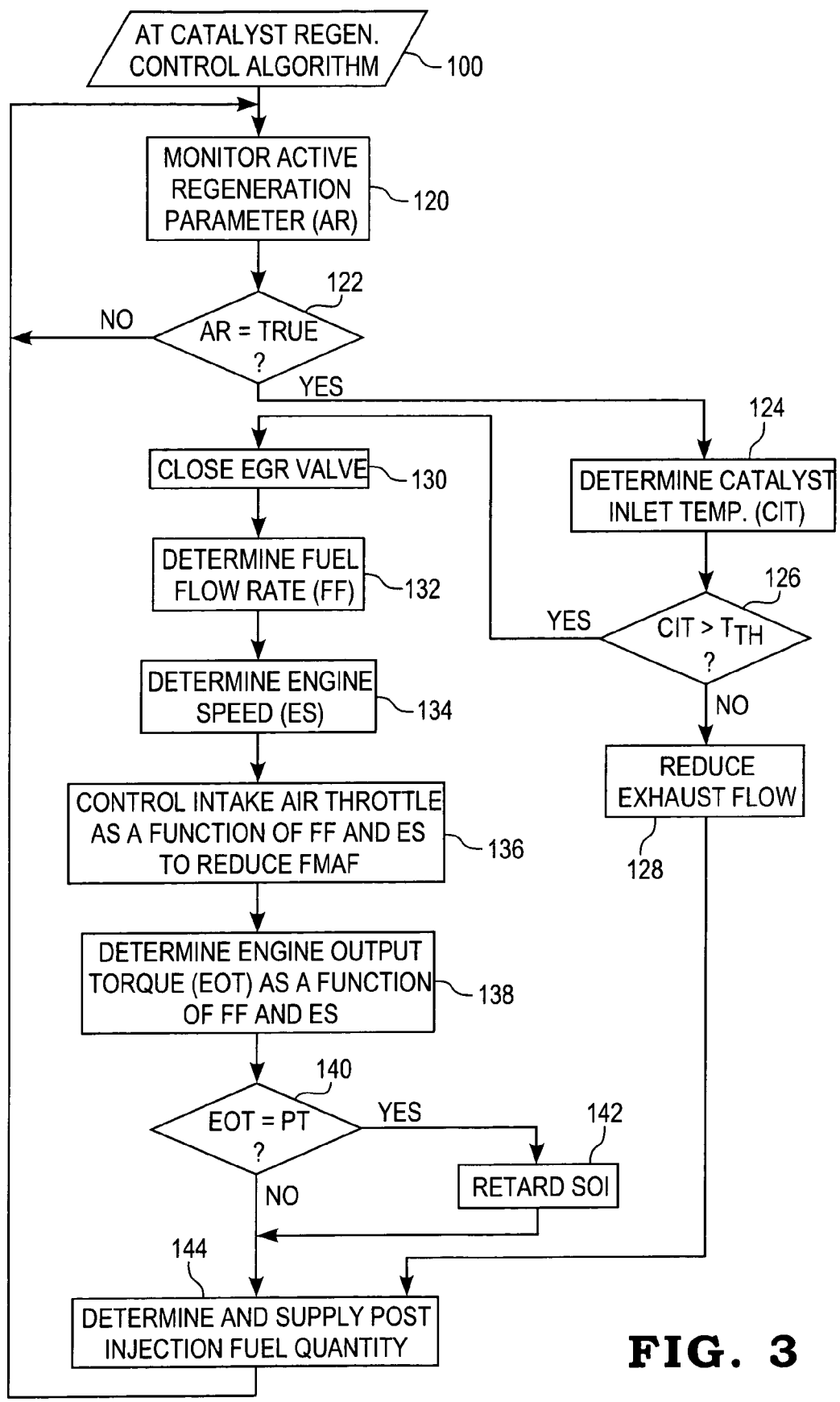
FIG. 3 is a flowchart of one illustrative embodiment of the aftertreatment catalyst regeneration control algorithm block of FIG. 2.

Referring now to FIG. 3, a flow chart of one illustrative embodiment of the aftertreatment catalyst regeneration control algorithm block 100 of FIG. 2 is shown. In the illustrated embodiment, the control algorithm 100 is provided in the form of one or more software programs stored in the memory unit 45 of the control circuit 40, and is executed by the control circuit 40 in a conventional manner. Alternatively, the one or more software programs may be stored in a remote memory unit, and/or be executed by an auxiliary control circuit (not shown) carried by the vehicle carrying the system 10. For purposes of this document, however, the control algorithm 100 will be described as being executed by the control circuit 40.

The control algorithm 100 begins at step 120 where the control circuit 40 is operable to monitor the active regeneration parameter, AR, which is generated internally to the control circuit 40 as described with respect to FIG. 2. Thereafter at step 122, the control circuit 40 is operable to determine the status of the active regeneration parameter, AR. If, at step 122, the control circuit 40 determines that AR is "false," execution of the algorithm 100 returns to step 120. If, on the other hand, the control circuit 40 determines at step 122 that the active regeneration parameter AR, is "true," this indicates that the aftertreatment component 34 is being actively regenerated, and algorithm execution advances to step 124.

At step 124, the control circuit 40 is operable to determine the catalyst inlet temperature, CIT, from the temperature signal produced by the temperature sensor 46. Thereafter at step 126, the control circuit 40 is operable to compare CIT to a temperature threshold, $T_{TH}$. If the control circuit 40 determines that CIT is less than or equal to $T_{TH}$, algorithm execution advances to step 128 where the control circuit 40 is operable to effectuate a reduction in the exhaust flow. In the illustrated embodiment, the threshold temperature, $T_{TH}$, corresponds to a minimum exhaust gas temperature required by the oxidation catalyst 32 to raise the exhaust gas temperature, with the introduction of hydrocarbons into the exhaust gas stream, to a temperature range suitable for regenerating the aftertreatment component 34. If the catalyst inlet temperature, CIT, is less than this threshold temperature, $T_{TH}$, the control circuit 40 is configured to control the engine 12 and/or air handling system in a manner that increases the exhaust gas temperature above $T_{TH}$. One technique for accomplishing this goal is to reduce exhaust gas flow through the exhaust gas conduit 28 so that the engine 12 will work harder and thereby increase the temperature of the exhaust. In one embodiment, the algorithm 100 is thus operable at step 128 to reduce the exhaust flow through the exhaust gas conduits 28 and 30 by producing a VGT command adjustment value, VGTA, that adjusts the VGT command, VGTC, in a manner that reduces the flow of exhaust gas through the exhaust gas conduits 28 and 30. Those skilled in the art will recognize other engine and/or air handling system control techniques for raising the temperature of exhaust gas above $T_{TH}$, and any one or more such techniques are contemplated by this disclosure.

If, at step 126, the control circuit 40 determines that the catalyst inlet temperature, CIT, is greater than or equal to $T_{TH}$, execution of the algorithm 100 advances to step 130 where the algorithm 100 is operable to close the EGR valve 38, in embodiments of the system 10 that include an EGR valve 38, by producing an EGR valve position command adjustment value, EGRA, that adjusts the EGR valve command, EGRC, in a manner that closes the EGR valve 38. In embodiments of the system 10 that do not include the EGR conduit 36 and the EGR valve 38, step 130 may be omitted. Following step 130, execution of the algorithm 100 advances to step 132 where the control circuit 40 is operable to determine the current fuel flow rate, FF, produced by the fuel control logic block 104. Thereafter at step 134, the control circuit 40 is operable to determine the current rotational speed of the engine 12, ES, via the engine speed signal produced by the engine speed sensor 66.

Following step 134, the algorithm 100 is operable to control the intake air throttle 74, as a function of FF and ES, in a manner that reduces the flow rate of fresh air through the air intake conduit 20 and into the intake manifold 14. In one embodiment, the algorithm 100 includes a table mapping values of fuel flow rate, FF, and engine speed, ES, to intake air throttle positions adjustment values. In this embodiment, the algorithm 100 is operable to execute step 136 by retrieving an appropriate intake air throttle position adjustment value, IATA, from the table that adjusts the intake air throttle command, IATC, in a manner that reduces the flow rate of fresh air into the intake air conduit 20 by the desired amount. Alternatively, the algorithm 100 may be operable at step 136 to map current values of fuel flow rate, FF, and engine speed, ES to appropriate intake air throttle position adjustment values, IATA, using one or more equations, graphs, or the like.

Following step 136, the control circuit 40 is operable at step 138 to determine current engine output torque, EOT, as a function of current values of the fuel flow rate, FF, and engine speed, ES, in a conventional manner. Thereafter at step 140, the control circuit 40 is operable to compare EOT to a peak torque value, PT. If, at step 140, the control circuit 40 determines that the current engine output torque, EOT, is at peak torque, PT, algorithm execution advances to step 142 where the control circuit 40 operable to retard the start-of-injection, SOI. In the illustrated embodiment, the algorithm 100 is operable to execute step 142 by providing a constant start-of-injection retarding value, SOIR, back to the fuel control logic block 104 of FIG. 2. The fuel control logic block 104 is then operable to retard the start-of-injection in a manner consistent with SOIR, as will be described in greater detail hereinafter with respect to FIG. 16. Alternatively or additionally, one or more other conventionally techniques may be used by the control circuit 40 at step 142 to retard SOI. In any case, execution of the algorithm 100 advances from step 128, the no branch of 140 and from step 142 to step 144 where the control circuit 40 is operable to determine and supply a post injection fuel quantity to the engine 12 to thereby selectively supply hydrocarbons to the exhaust gas stream for regenerating the aftertreatment component 34. Details relating to one embodiment for executing step 144 will be described hereinafter with respect to FIGS. 4-17. From step 144, execution of the algorithm 100 loops back to step 120 for continually execution of the algorithm 100.

Figure 4:
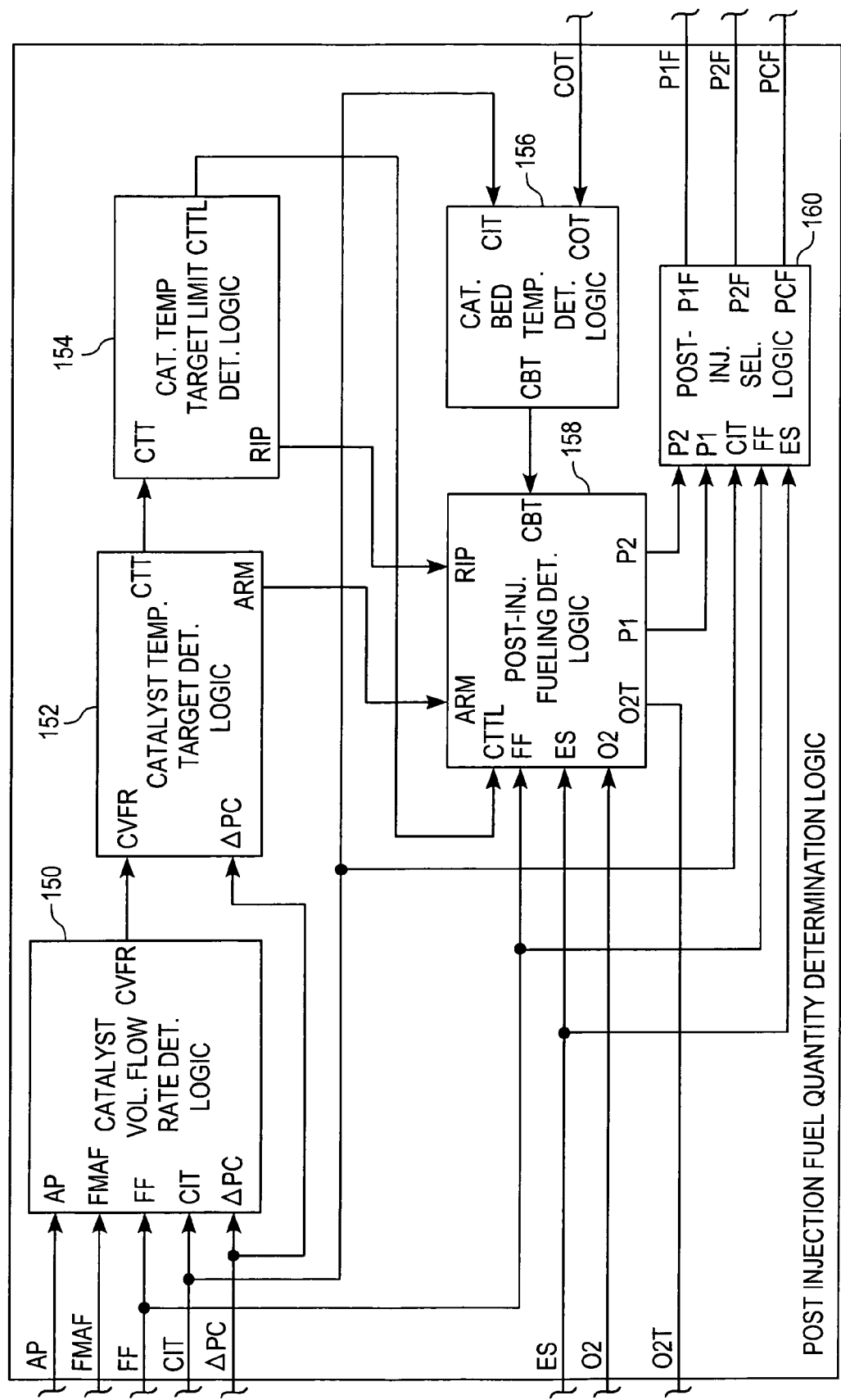
FIG. 4 is a block diagram of one illustrative embodiment of the post injection fuel quantity determination portion of the post injection fuel quantity determination and supply block of the flowchart of FIG. 3.

Referring now to FIG. 4, a block diagram of one illustrative embodiment of the post injection fuel quantity determination portion of the aftertreatment catalyst regeneration control algorithm 100; i.e. step 144 of the control algorithm 100 illustrated in FIG. 3, is shown. In the illustrated embodiment, the post injection fuel quantity determination logic block 144 includes a catalyst volumetric flow rate determination logic block 150 receiving as inputs the ambient pressure signal, AP, produced by the pressure sensor 62, the fresh mass air flow signal, FMAF, produced by the mass air flow sensor 70, the fuel flow rate value, FF, produced by the fuel control logic block 104, the catalyst inlet temperature signal, CIT, produced by the temperature sensor 46, and the catalyst delta pressure value, ΔPC, produced by the ΔP sensor 50. The logic block 150 is operable to process the foregoing input signals and values, and produce a catalyst volumetric flow rate value, CVFR, corresponding to the volumetric flow rate of exhaust gas through the aftertreatment component 34. The catalyst volumetric flow rate value, CVFR, and the catalyst delta pressure signal, ΔPC, produced by the ΔP sensor 50, are both provided as inputs to a catalyst temperature target determination logic block 152. The logic block 152 is operable to process the foregoing input signals and values, and produce a catalyst target temperature value, CTT, and an active regeneration mode value, ARM. The catalyst target temperature value, CTT, is provided as an input to a catalyst target temperature limit determination logic block 154, which is operable to process CTT and produce a limited catalyst target temperature value, CTTL, and a regeneration in process value, RIP.

The post injection fuel quantity determination logic block 144 further includes a catalyst bed temperature determination logic block 156 receiving as inputs the catalyst inlet temperature signal, CIT, produced by the temperature sensor 46 and the catalyst outlet temperature signal, COT, produced by the temperature sensor 58. The catalyst bed temperature determination logic block 156 is operable to process these temperature signals, and produce a catalyst bed temperature value, CBT, corresponding to the internal operating temperature of the aftertreatment component 34.

The post injection fuel quantity determination logic block 144 further includes a post-injection fueling determination logic block 158 receiving as inputs the active regeneration mode value, ARM, produced by the catalyst temperature target determination logic block 52, the limited catalyst target temperature value, CTTL, and the regeneration in progress value, RIP, produced by the catalyst temperature target limit determination logic block 154, the catalyst bed temperature bed value, CBT, produced by the catalyst bed temperature determination logic block 156, the fuel flow rate value, FF, produced by the fuel control logic block 104, the engine speed signal, ES, produced by the engine speed sensor 66, the oxygen signal, O2, produced by the oxygen sensor 42, and the oxygen target value, O2T, stored in the memory block 102. The post-injection fueling determination logic block 158 is operable to process the foregoing input signals and values, and produce two post-injection fuel values, P1 and P2, which correspond to separate post-injection fuel quantities or flow rates.

The post injection fuel quantity determination logic block 144 further includes a post-injection selection logic block 160 receiving as inputs the post injection fuel values P1 and P2, produced by the post-injection fueling determination logic block 158, the catalyst inlet temperature signal, CIT, produced by the temperature signal 46, the fuel flow rate value, FF, produced by the fuel control logic block 104, and the engine speed signal, ES, produced by the engine speed sensor 66. The post-injection selection logic block 160 is operable to process the foregoing input signals and values, and produce final post injection fuel values, P1F and P2F, which correspond to final values of P1 and P2 respectively, and to also produce a catalyst post injection fuel value, PCF, the purpose of which will be described in greater detail hereinafter.

Figure 5:
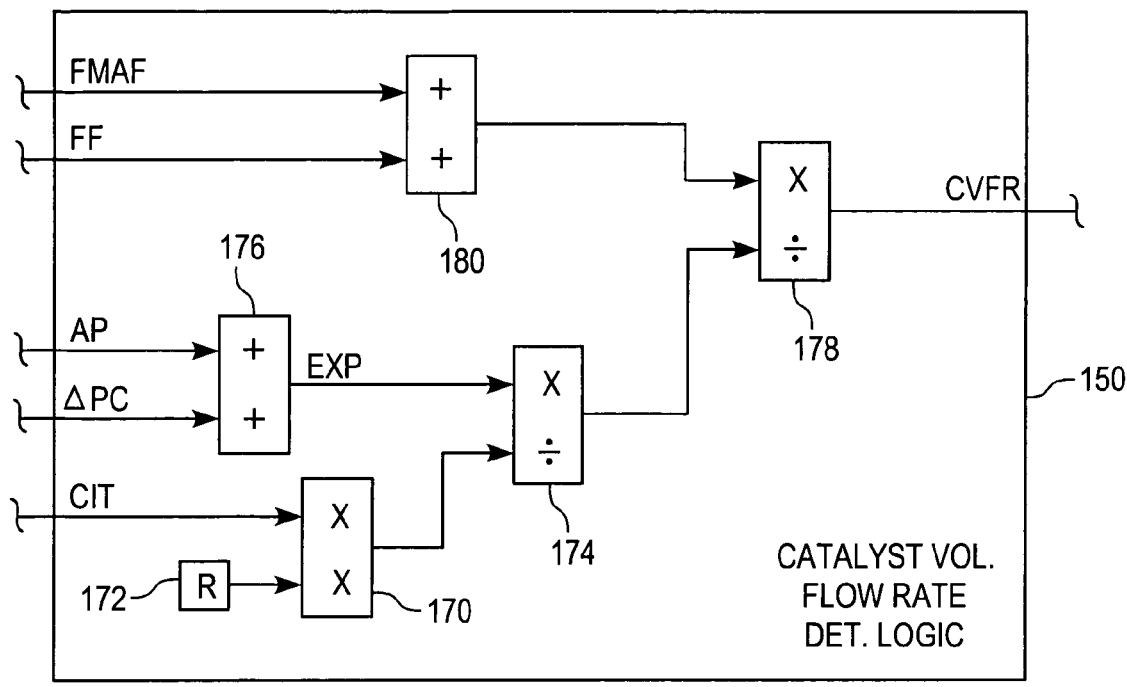
FIG. 5 is a block diagram of one illustrative embodiment of the volumetric flow rate determination block of FIG. 4.

Referring now to FIG. 5, a block diagram of one illustrative embodiment of the volumetric flow rate determination logic block 150 of FIG. 4 is shown. In the illustrated embodiment, the catalyst volumetric flow rate determination logic block 150 includes a multiplication block 170 receiving as inputs the catalyst inlet temperature signal, CIT, and a temperature conversion constant, R, stored in a memory block 172, for converting the catalyst inlet temperature, CIT, from °F. to °K. The output of the multiplication block 170 is thus the product of R and CIT, and is provided to a division input of an arithmetic block 174. A summation block 176 receives as inputs the ambient pressure signal, AP, and the catalyst delta pressure signal, ΔPC, which are summed by the summation block 176 to produce an exhaust gas pressure value, EXP, which is provided to a multiplication input of the arithmetic block 174. The output of the arithmetic block 174 is provided to a division input of another arithmetic block 178. Another summation block 180 receives as inputs the fresh mass air flow signal, FMAF, and the fuel flow rate value, FF, and produces as its output the sum of FMAF and FF. This output is provided to a multiplication input of the arithmetic block 178, the output of which is the catalyst volumetric flow rate value, CVFR, which is thus calculated according to the equation CVFR= (FMAF+FF)/[(AP+ΔPC)/CIT(°K)].

Figure 6:
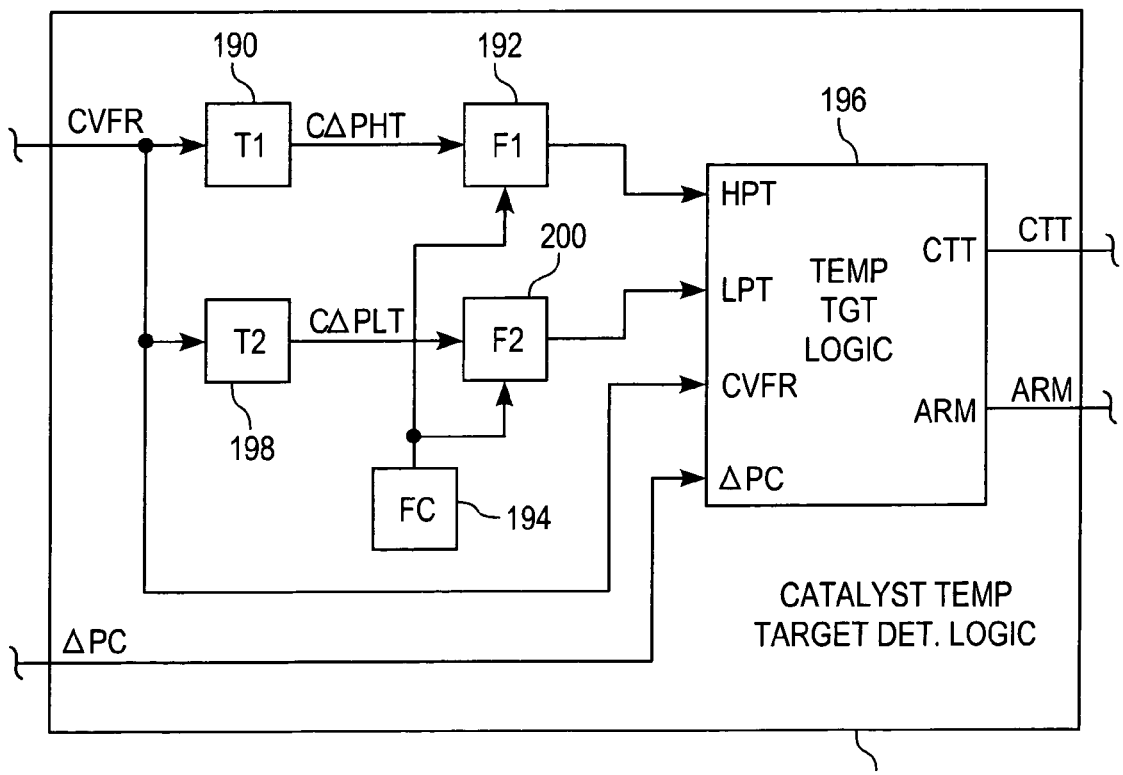
FIG. 6 is a block diagram of one illustrative embodiment of the catalyst temperature target determination logic block of FIG. 4.

Referring now to FIG. 6, a block diagram of one illustrated embodiment of the catalyst temperature target determination logic block 152 of FIG. 4 is shown. In the illustrated embodiment, the catalyst temperature target determination logic block 152 includes a first table 190 receiving as an input the catalyst volumetric flow rate value, CVFR, produced by the catalyst volumetric flow rate determination logic block 150. The table 190 is configured to map values to CVFR, to values of a catalyst delta pressure high threshold value, CΔPHT, in units of psi. CΔPHT is provided to a core filter block 192 also receiving a filter constant, FC, stored in a memory block 194. The output of the filter block 192 is a high pressure target value provided to a high pressure target input, HPT, of a temperature target logic block 196. The catalyst volumetric flow rate value, CVFR, is also provided as an input to a second table 198 configured to map CVFR to a catalyst delta pressure low threshold value, CΔPLT, which is provided as an input to a second core filter 200 receiving the filter constant, FC, stored in the memory block 194. The output of the second filter block 200 is a low pressure target value that is provided to a low pressure target input, LPT, of the temperature target logic block 196. The temperature target logic block 196 also receives as inputs the catalyst volumetric flow rate value, CVFR, and the catalyst delta pressure signal, ΔPC, produced by the ΔP sensor 50. The temperature target logic block 196 is operable to process the foregoing input signals and values, and produce the catalyst target temperature value, CTT, as well as the active regeneration mode value, ARM.

Figure 7:
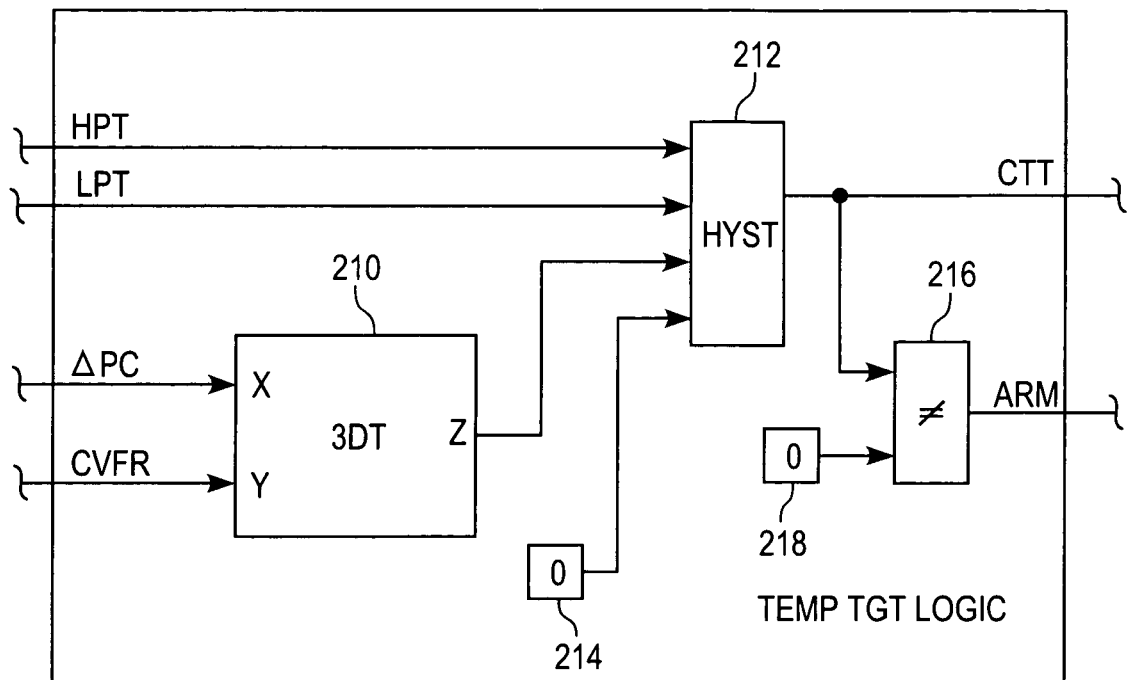
FIG. 7 is a block diagram of one illustrative embodiment of the temperature target determination logic block of FIG. 6.

Referring now to FIG. 7, a block diagram of one illustrative embodiment of the temperature target logic block 196 of FIG. 6 is shown. In the illustrated embodiment, the temperature logic block 196 includes a 3-D table 210 receiving as "X" and "Y" inputs the ΔPC and CVFR values, respectively. The table 210 is configured to map ΔPC and CVFR values to catalyst target temperature values, in units of °F. The catalyst target temperature values produced by the table 210 are provided to a hysteresis block 212 having high and low switch points defined by the high pressure target and low pressure target values, HPT and LPT, respectively. The hysteresis block 212 has a lower limit of zero that is stored in a memory block 214. The output of the hysteresis block 212 is the catalyst target temperature value, CTT, which is also provided as an input to an arithmetic block 216 having another input receiving the value of zero stored in a memory block 218. The output of the arithmetic block 216 is the active regeneration mode value ARM. In the illustrated embodiment, the arithmetic logic block 216 is a "not equal" function so that ARM is "1" or "true" as long as CTT is not equal to zero, and is otherwise "zero" or "false." The active regeneration mode value, ARM, is thus "true" as long as the catalyst temperature target value CTT, is greater than zero.

Figure 8:
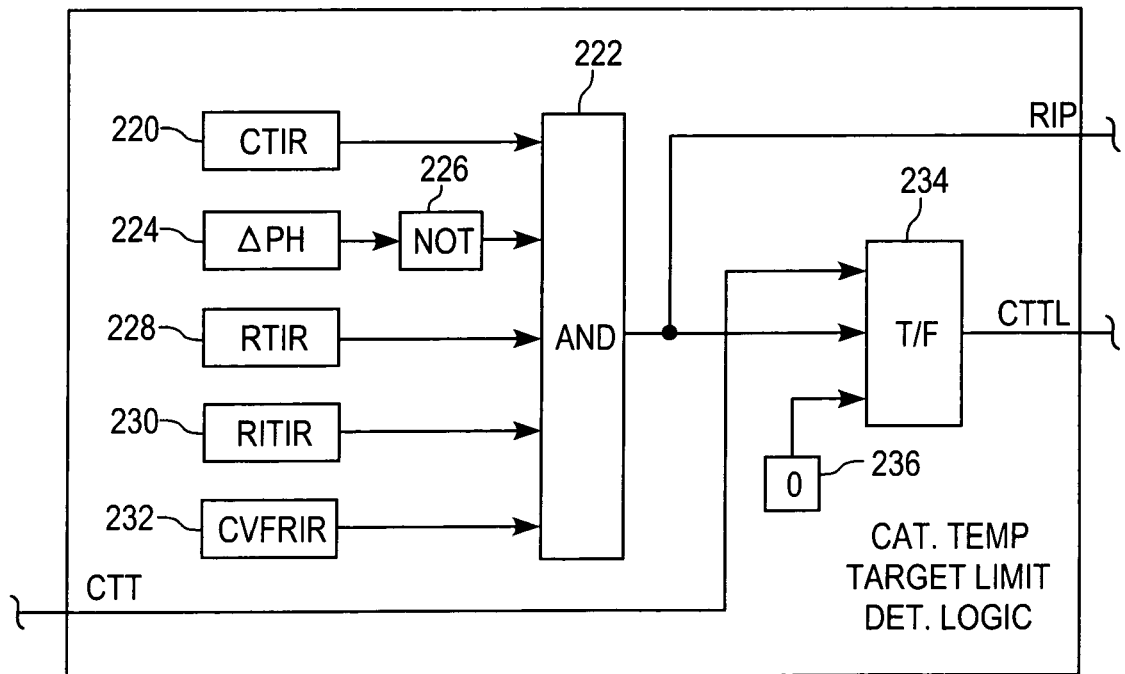
FIG. 8 is a block diagram of one illustrative embodiment of the catalyst temperature target limit determination logic block of FIG. 4.

Referring now to FIG. 8, a block diagram of one illustrative embodiment of the catalyst target temperature limit determination block 154 of FIG. 4 is shown. In the illustrated embodiment, the catalyst target temperature limit determination logic block 154 includes a number of logic blocks 220, 224 and 228-232, each executing independent, conventional sensor and value check algorithms operable to determine whether selected sensor and other values are within expected ranges. For example, the logic block 154 includes a catalyst temperature in-range check block 220 executing a conventional diagnostic algorithm to determine whether the temperature of the aftertreatment component 34 is in-range. If so, the catalyst temperature in-range value, CTIR, of the block 220 will be "1" or "true", and will otherwise be "0" or "false." The output of the block 220 is provided to one input of an AND block 222. The blocks 224 and 228-232 execute similar, conventional in-range checks to determine whether the delta pressure across the aftertreatment component 34 is too high, to determine whether the regeneration time of the aftertreatment component 34 is in-range, to determine whether the regeneration interval time between regenerations of the aftertreatment component 34 is in-range, and to determine whether the volumetric flow rate of exhaust gas through the aftertreatment component 34 during regeneration is in-range, respectively. If each of the foregoing in-range checks indicate that the corresponding values are in-range, and the delta pressure across the aftertreatment component 34 is not too high, the output of the AND block 222 will be "1" or "true," and will otherwise be "0" or "false." The output of the AND block 222 is the regeneration in progress value, RIP, and is also provided to a control input of a true/false block 234 having a "true" input receiving the catalyst target temperature value, CTT, and a "false" input receiving the value zero that is stored in a memory block 236. The output of the true/false block 234 is the limited catalyst target temperature value, CTTL. Thus, as long as the catalyst temperature, regeneration time, regeneration interval, and volumetric flow rate during regeneration are all in-range, and the delta pressure across the aftertreatment component 34 is not too high, RIP will be "1" or "true," and CTTL will equal CTT. If, on the other hand, one of the foregoing values is out-of-range, or the delta pressure across the aftertreatment component 34 is too high, RIP will be "0" or "false," and CTTL will be zero.

Figure 9:
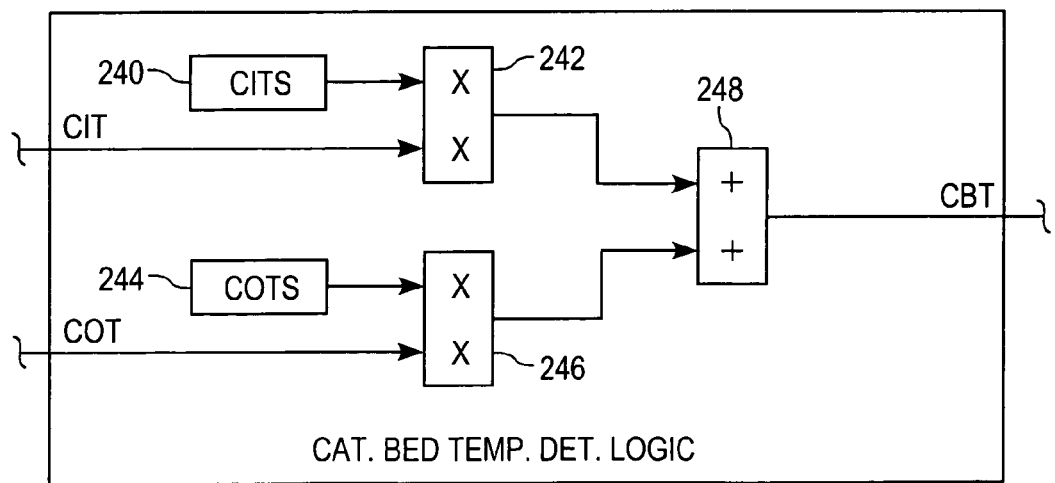
FIG. 9 is a block diagram of one illustrative embodiment of the catalyst bed temperature determination logic block of FIG. 4.

Referring now to FIG. 9, a block diagram of one illustrative embodiment of the catalyst bed temperature determination logic block 156 of FIG. 4 is shown. In the illustrated embodiment, the catalyst bed temperature determination logic block 156 includes a catalyst inlet temperature scale value, CITS, that is stored in a memory block 240 and provided to a first input of a multiplication block 242 having a second input receiving the catalyst inlet temperature signal, CIT, produced by the temperature sensor 46. Likewise, a catalyst outlet temperature scale value, COTS, is stored in a memory block 244, and is provided to one input of another multiplication block 246 having a second input receiving the catalyst outlet temperature signal, COT, produced by the temperature sensor 58. The outputs of the multiplication blocks 242 and 246 are both provided to a summation block 248 producing as its output the catalyst bed temperature value, CBT, according to the equation CBT=(CIT*CITS)+(COT*COTS).

Figure 10:
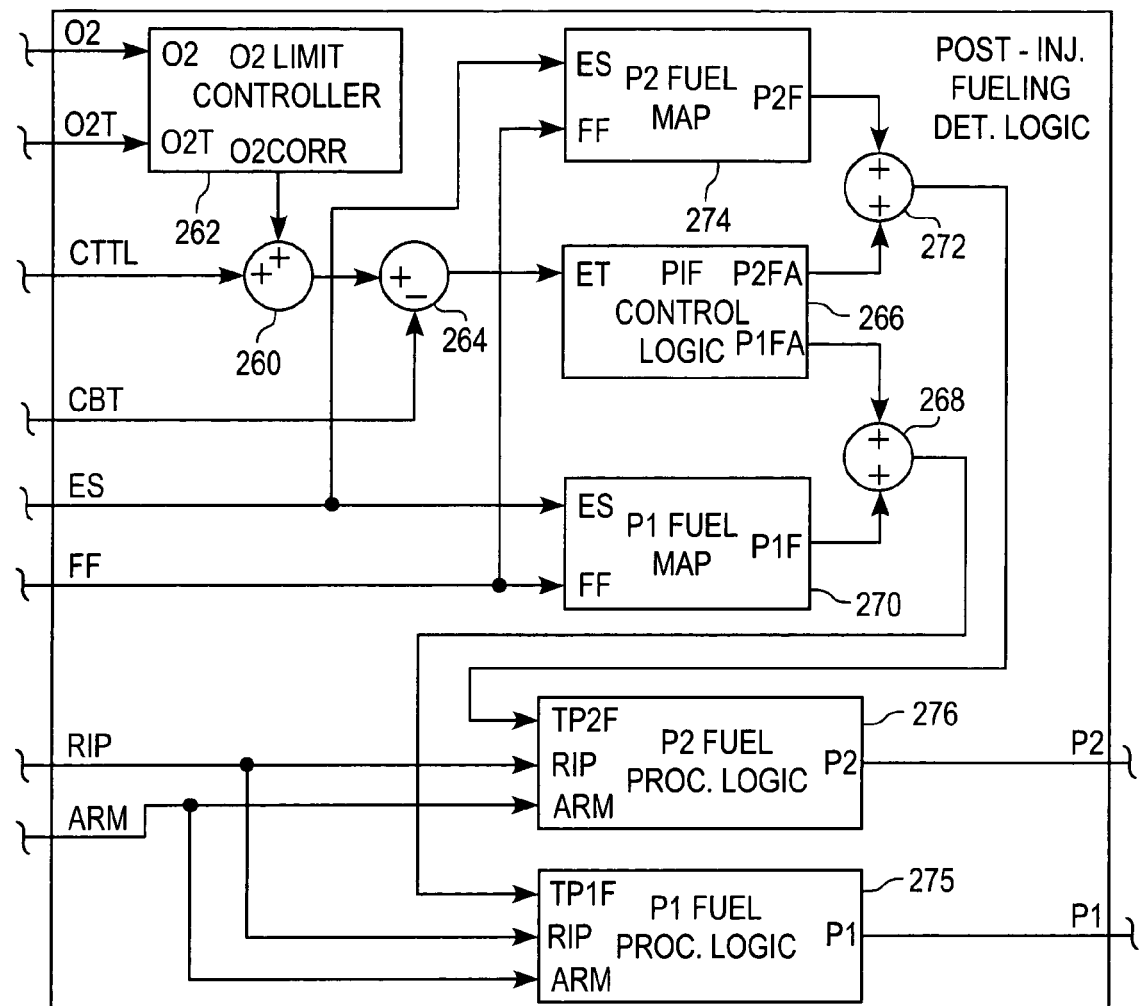
FIG. 10 is a block diagram of one illustrative embodiment of the post-injection fueling determination logic block of FIG. 4.

Referring now to FIG. 10, the block diagram of one illustrative embodiment of the post-injection fueling determination logic block 158 of FIG. 4 is shown. In the illustrated embodiment, the post-injection fueling determination logic block 158 includes a summation block 260 having one input receiving the limited catalyst target temperature value, CTTL, and another input receiving an oxygen correction value, O2CORR, produced by an oxygen limit controller block 262. The oxygen limit controller block 262 has a first input receiving the oxygen signal, O2, produced by the oxygen sensor 42, and a second input receiving the oxygen target value, O2T, stored in the memory block 102 (FIG. 2). The oxygen limit controller block 262 is operable to process the O2 and O2T information and produce the oxygen correction value, O2CORR, in the form of a temperature correction value determined as a function of a difference between O2 and O2T. The sum of CTTL and O2CORR is provided to an addition input of an arithmetic block 264 having a subtraction input receiving the catalyst bed temperature value, CBT. The output of the arithmetic block 264 is a temperature error, ET, corresponding to a difference between the sum of CTTL and the oxygen correction temperature value, O2CORR, and the catalyst bed temperature, CBT, or ET=(CTTL+O2CORR)−CBT. This value is provided to an error temperature input, ET, of a post-injection fueling control logic block 266.

The post-injection fueling control logic block 266 is operable to process the error temperature value, ET, and produce first and second post-injection fueling adjustment values, P1FA and P2FA. P1FA is applied to one input of a summation block 268 having a second input receiving the output of a first post-injection fuel map 270 having a first input receiving the engine speed signal, ES, and a second input receiving the fuel flow value, FF. The post-injection fuel map 270 is operable to map current values of the engine speed, ES, and fuel flow rate, FF, to a first base-line post-injection fuel quantity or fuel flow rate, P1F. The output of the summation block 268 is a first total post-injected fuel quantity or flow rate which is the sum of P1F and P1FA, and which is supplied to a total post-injection fuel input, TP1F, of a first post-fuel processing logic block 275.

The second post-injection fuel adjustment value, P2FA, is provided to one input of another summation block 272 having another input receiving the output of a second post-injection fuel map 274. The second post-injection fuel map 274 has a first input receiving the engine speed signal, ES, and a second input receiving the fuel flow rate value, FF, and is operable to map ES and FF to a second base-line post-injection fuel value, P2F. The output of the summation block 272 is thus the sum of P2F and P2FA, and is provided to a total post-injection fuel input, PT2F, of a second fuel processing logic block 276. Both of the fuel processing logic blocks 275 and 276 receive as further inputs the regeneration in progress value, RIP, and the active regeneration mode value, ARM. The first fuel processing logic block 275 is operable to process its input values and produce as an output the post-injection fuel value, P1. Similarly, the second fuel-processing logic block 276 is operable to process its input values and produce as an output the second post-injection fueling value, P2.

Figure 11:
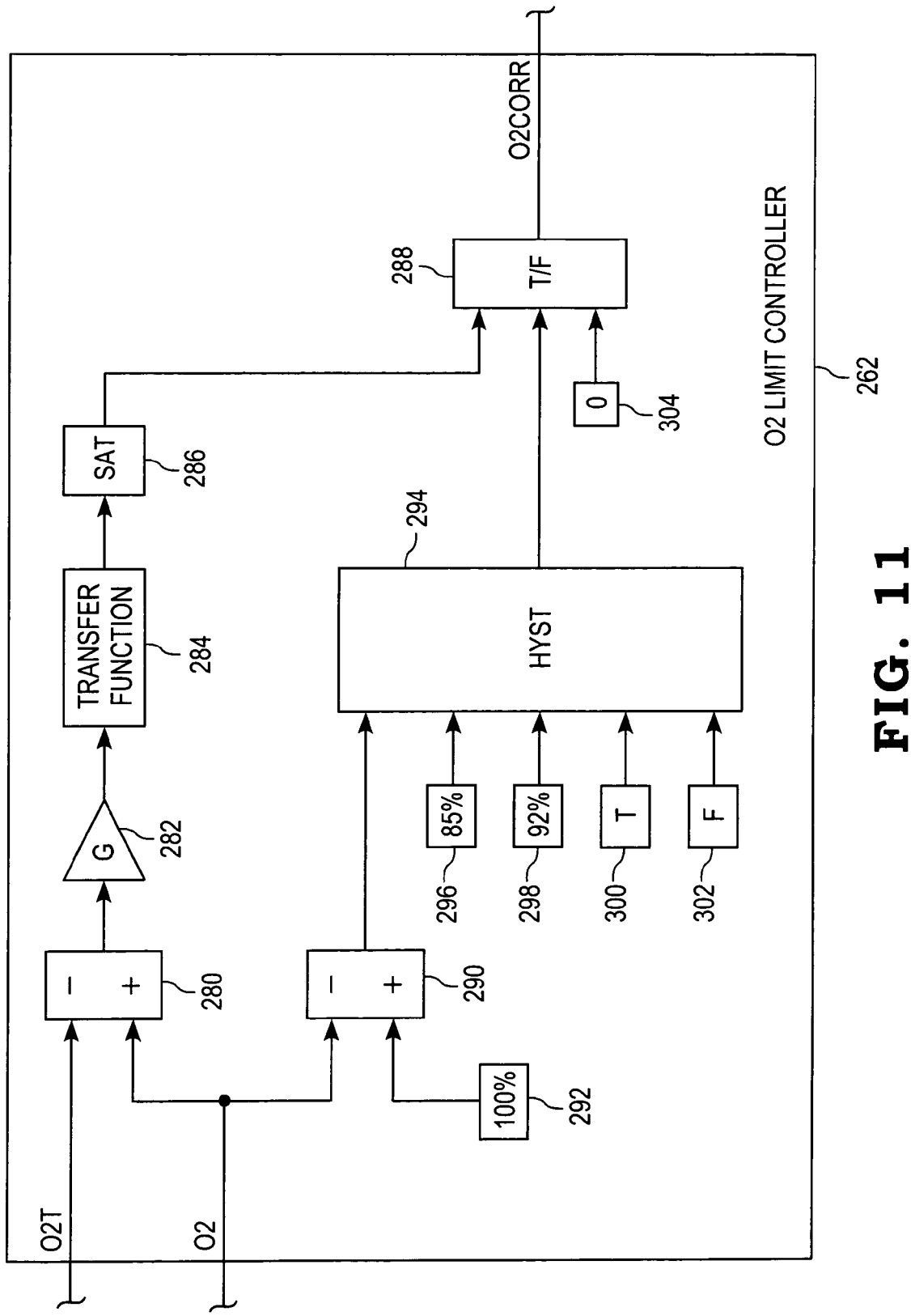
FIG. 11 is a block diagram of one illustrative embodiment of the oxygen limit controller block of FIG. 10.

Referring now to FIG. 11, a block diagram of one illustrative embodiment of the oxygen limit controller block 262 of FIG. 10 is shown. In the illustrated embodiment, the oxygen limit controller block 262 includes an arithmetic block 280 having a subtraction input receiving the oxygen target value, O2T, and an addition input receiving the oxygen signal, O2. The output of the arithmetic block 280 is the difference between O2 and O2T and is passed through a gain block 282 to a transfer function block 284. In one embodiment, the transfer function is 1/(k*S+1), wherein "k" is a selectable constant, although it will be understood that other transfer functions may be used. The output of the transfer function block 284 is provided to a saturation block 286, the output of which is provided to a "true" input of a true/false block 288. The logic block 262 further includes a second arithmetic block 290 having a subtraction input receiving the oxygen signal, O2, and an addition input receiving the value of 100% that is stored in a memory block 292. The output of the arithmetic block 290 is thus the difference between 100% and the percentage of oxygen concentration in the exhaust gas. This value is provided to a hysteresis block 294 having an upper switch point of 92% stored in a memory block 298, and a lower switch point of 85% stored in a memory block 296. The output of the hysteresis block 294 may be "true," which is stored in a memory block 300 or "false," which is stored in a memory block 302. The output of the hysteresis block 294 is provided to the control input of the true/false block 288, which has a "false" input receiving the value zero that is stored in a memory block 304. The output of the true/false block is the oxygen correction value, O2CORR. The transfer function 284 is configured to convert the difference between the oxygen signal, O2, and the oxygen target value, O2T, to a temperature offset value. If the oxygen concentration in the exhaust gas is less than 8%, the output of the hysteresis block 294 will be "true," and the correction value, O2CORR, will then be the temperature offset value produced at the output of the saturation block 286. If the oxygen concentration in the exhaust gas rises above 15%, the output of the hysteresis block 294 will be "false," in which case the correction value, O2CORR, will be zero.

Figure 12:
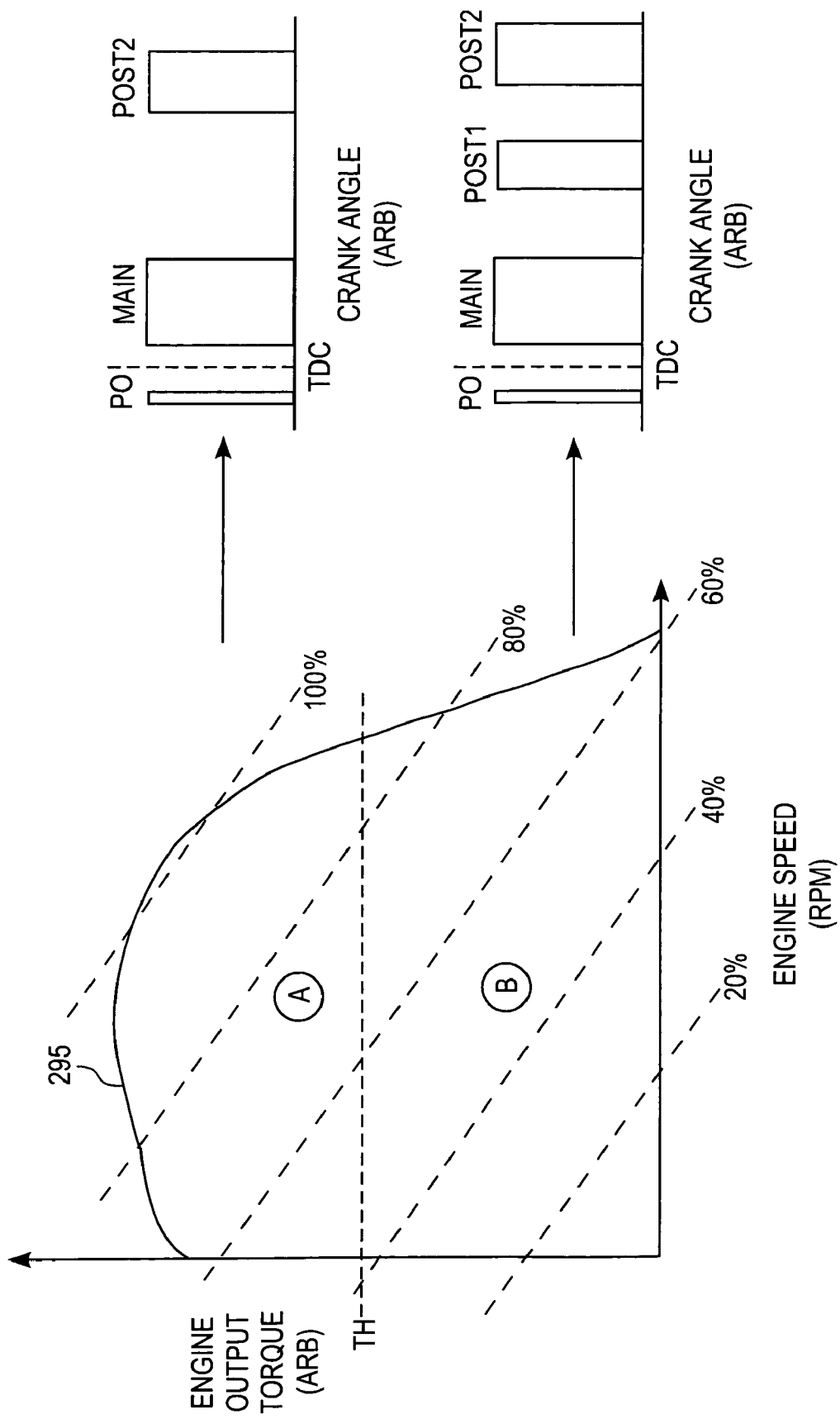
FIG. 12 is a diagram illustrating operation of the post-injection fueling (PIF) control logic block of FIG. 10 under different engine output torque conditions.

Referring now to FIG. 12, a diagram is shown illustrating operation of the post-injection fueling determination logic block 158 of FIG. 10 under different engine operating conditions. FIG. 12 includes a plot of engine output torque versus engine speed, showing an engine output torque curve 295. The engine output torque curve 295 represents the maximum output torque of the engine 12 over all possible engine speeds. The engine 12 may thus operate anywhere on or within the engine output torque curve 295, and the actual engine operating point at any given time will be a function of engine speed and engine load. Superimposed onto the illustrated plot are lines of constant engine load illustrated for arbitrary engine load values of 20, 40, 60, 80, and 100%. Engine load, as this term is used herein, will be understood to be a ratio of the current fueling flow rate, FF, and a difference between full, or 100%, load fueling and no-load, or 0%, fueling. It will be appreciated that other conventional definitions of engine load may alternatively be used.

Also superimposed onto the illustrated plot is an engine output torque threshold value, TH, that bisects the region within the engine output torque curve 295 into a first region, A, bounded by TH and the engine output torque curve 295, and a second region, B, bounded by TH, the engine output torque curve 295, and the axes of the plot. It will be understood that while the engine output torque threshold value, TH, is illustrated in FIG. 12 as being a constant engine output torque value, the engine output torque threshold value, TH, may alternatively be a function of any one or more of engine load, engine speed, fuel flow rate, any other engine or air handling mechanism operating parameter, or an arbitrary function.

In any case, the first and second fuel maps 270 and 274 of the post-injection fueling determination logic block 158 are configured to produce the base-line post-injection fuel values, P1F and P2F, as functions of the engine output torque threshold value, TH. For example, as illustrated in FIG. 12, if the engine output torque is within region A, the post-injection fuel map 270 produces a zero-valued first post-injection fuel value, PIF, and the second post-injection fuel map 274 produces a non-zero second post-injection fuel value, P2F. This will result in production of only the second post-fuel-injection pulse, POST2 as illustrated in FIG. 12. As will be described in greater detail hereinafter with respect to FIGS. 15 and 16, the timing, or start-of-injection, of the POST2 fuel pulse will occur after combustion of a main quantity of fuel illustrated by the MAIN fuel pulse. On the other hand, if the engine 12 is operating within region B of the illustrated plot, the first and second post-injection fuel maps 270 and 274 will both produce non-zero, base-line, post-injection fuel values, P1F and P2F, respectively, resulting in two post-injection fuel pulses, POST1 and POST2, as illustrated in FIG. 12. As will also be described in greater detail hereinafter with respect to FIGS. 16 and 17, the timing, or start-of-injection, of POST1 and POST2 will be controlled such that POST1 occurs near the end of combustion of the main fuel pulse, MAIN, while the second post-injection fuel pulse, POST2, will occur after combustion of the main fuel pulse, MAIN.

If regeneration of the aftertreatment component 34 is occurring at low engine output torque values; e.g., within region B, the first post-injection fuel pulse, POST1, is generated near the end of combustion of the main fuel pulse, MAIN, in order to increase the temperature of the exhaust gas to ensure more complete regeneration of the aftertreatment component 34 when the second post-injection fuel pulse, POST2, occurs thereafter. In contrast, if regeneration of the aftertreatment component 34 is occurring at higher engine output torque values; e.g., within region A, the exhaust gas temperature is likely high enough to ensure adequate regeneration of the aftertreatment component 34. In this case, only a single post-injected fuel quantity, POST2, is generated after combustion of the MAIN injected fuel quantity is complete.

Figure 13:
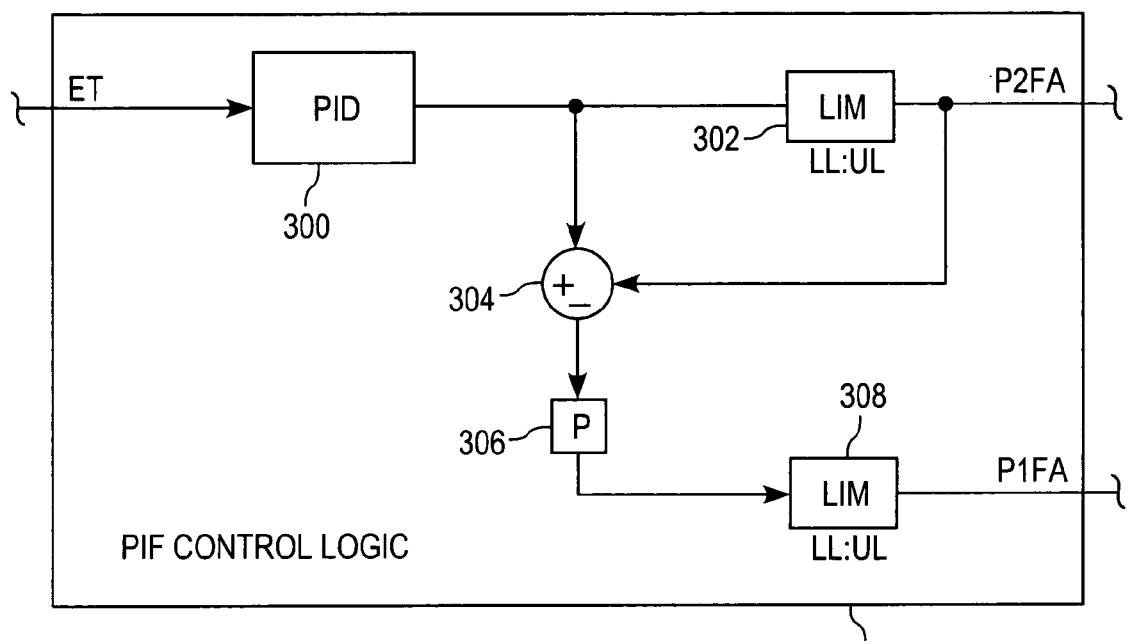
FIG. 13 is a block diagram of one illustrative embodiment of the post-injection fueling (PIF) control logic block of FIG. 10.

Referring now to FIG. 13, a block diagram of one illustrative embodiment of the post-injection fuel control logic block 266 of FIG. 10 is shown. In the illustrated embodiment, the post-injection fuel control logic block 266 includes a controller 300 receiving the temperature error value, ET, produced by the arithmetic logic block 264 of FIG. 10. In the illustrated embodiment, the controller block 300 is configured as a proportional-integral-derivative, or PID, controller, although other conventional control structures may alternatively be used. The output of the controller 300 is supplied to a limiter block 302 having a lower limit, LL, and an upper limit, UL, the output of which is the second post-injection adjustment value, P2FA. The output of the controller block 300 is also supplied to an addition input of an arithmetic logic block 304 having a subtraction input receiving the second post-injection fuel adjustment value, P2FA. The difference between the post-injection fuel value produced by the controller block 300, and P2FA, is supplied to a second controller 306, the output of which is supplied to another limiter block 308 having a lower limit, LL, and an upper limit, UL, and an output producing the first post-injection fuel-adjustment value, P1FA. In the illustrated embodiment, the controller 306 is configured as a proportional controller, although other conventional control strategies may alternatively be used. According to the control structure illustrated in FIG. 13, the post-injection fuel control logic block 266 is operable to adjust the catalyst temperature-based post-injection fuel amount by first adjusting the second post-injection fuel value, P2FA, between its two extremes, LL and UL, and to the extent that any additional or further adjustment is required, adjusting the first post-injection fuel adjustment value, P1FA.

Figure 14:
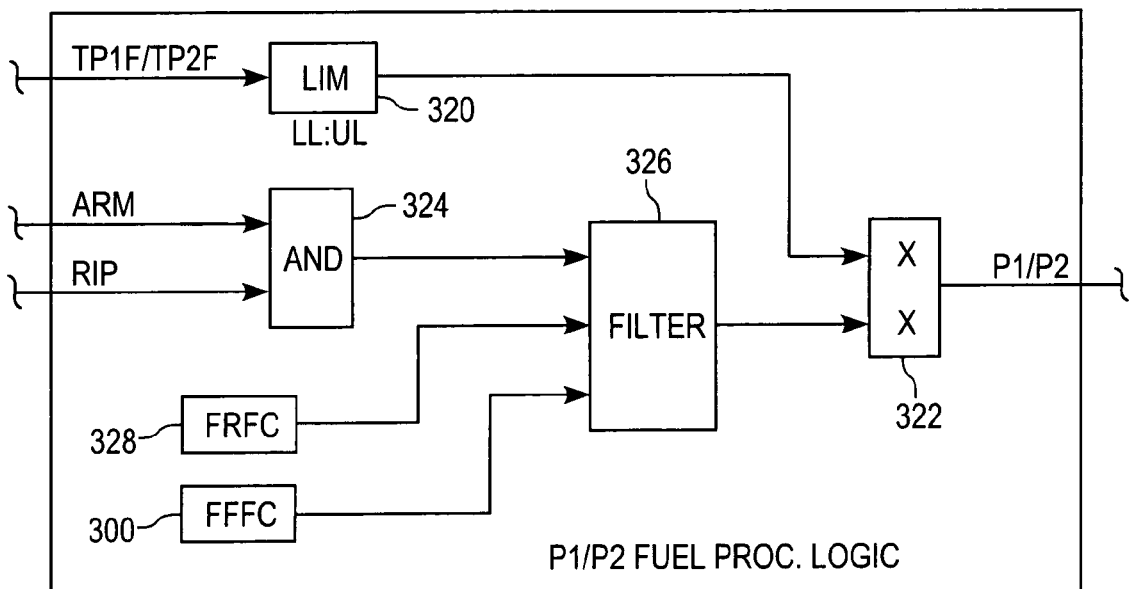
FIG. 14 is a block diagram of one illustrative embodiment of the P1 and P2 fuel processing logic blocks of FIG. 10.

Referring now to FIG. 14, a block diagram of one illustrative embodiment of either of the first or second post fuel processing and logic blocks 275 and 276 is shown. The logic block 275, 276 includes a first limiter block 320 having a lower limit, LL, and an upper limit, UL, receiving the total post injection fuel value, TP1F or TP2F. The output of the limiter block 320 is provided to a first input of a multiplication block 322. The active regeneration mode value, ARM, and the regeneration in progress in value, RIP, are both provided to inputs of an AND block 324, having an output provided to an input of a core filter block 326. A fuel rising filter constant value, FRFC, is stored in a memory block 328 and is supplied to the core filter block 326. Likewise, a fuel falling filter constant, FFFC, is stored in a memory block 330 and is also supplied to the core filter block 326. The output of the core filter block 326 is provided to a second input of the multiplication block 322, so that the output of the multiplication block 322 is a product of the limiter block 320 and the core filter block 326, and is the post-injection fuel value, P1 or P2.

Figure 15:
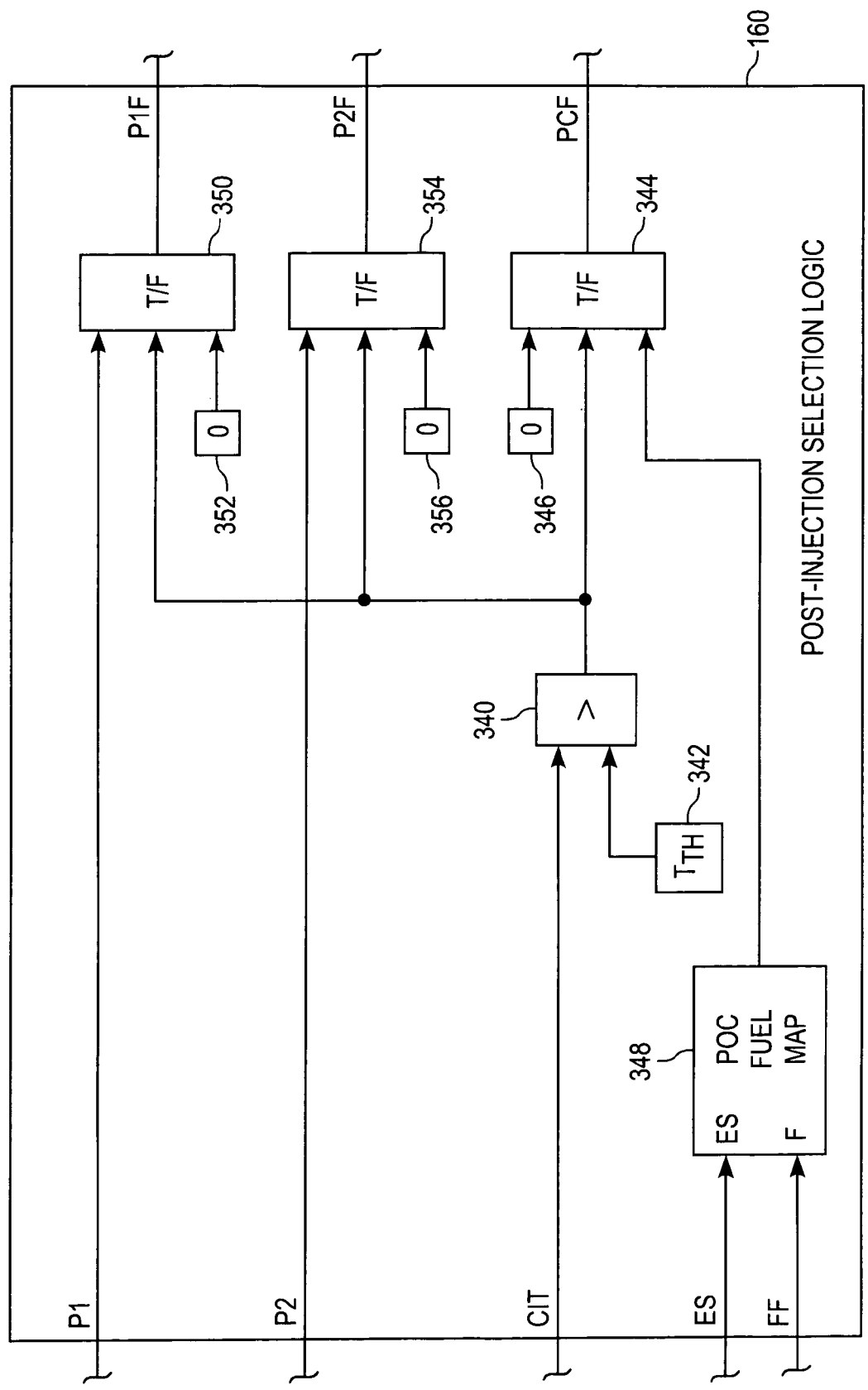
FIG. 15 is a block diagram of one illustrative embodiment of the post-injection selection logic block of FIG. 4.

Referring now to FIG. 15, a block diagram of one illustrative embodiment of the post-injection selection logic block 160 of FIG. 4 is shown. In the illustrated embodiment, the logic block 160 includes an arithmetic logic block 340 having one input receiving the catalyst inlet temperature value, CIT, and another input receiving the temperature threshold value, $T_{TH}$, which is stored in a memory block 342. The arithmetic logic block 340 is a "greater than" function so that the output of the arithmetic logic block 340 is "1" or "true" as long as CIT is greater than $T_{TH}$, and is otherwise "0" or "false." The output of the logic block 340 is supplied to the control inputs of true/false blocks 344, 350, and 354. The "true" input of the true/false block 344 receives a zero value stored in a memory block 346, and the "false" input of the true/false block 344 receives the output of a post-injection oxidation catalyst fuel map 348 having inputs receiving the engine speed signal, ES, and the fuel flow rate value, FF. The post-injection oxidation catalyst fuel map block 348 is configured to produce a single post-injection fuel valve that will be used to increase the temperature of the exhaust gas when the catalyst inlet temperature, CIT, is less than $T_{TH}$. The output of the true/false block 344 is the catalyst post-fuel value, PCF, and is thus equal to zero as long as the catalyst inlet temperature, CIT, is greater than the threshold value, $T_{TH}$. If, however, CIT is less than or equal to $T_{TH}$, PCF is the post-fuel value produced by the oxidation catalyst post-injection fuel map 348. It will be understood that the blocks 340-348 correspond to the two separate paths to step 144 of the algorithm 100 of FIG. 3 that occur depending upon the result of the process steps 124 and 126.

The first post-injection fuel value, P1, is supplied to the "true" input of the true/false block 350, and the output of the true/false block 350 is the first post-injection fuel quantity, P1F. The second post-injection fuel value, P2, is supplied to the "true" input of the true/false block 354, and the output of the true/false block 354 is the second post-injection fuel quantity, P2F. Zeros are stored in memory blocks 352 and 356, and are provided therefrom to the "false" inputs of the true/false blocks 350 and 354 respectively. As long as the catalyst inlet temperature, CIT, is greater than the temperature threshold, $T_{TH}$, P1F=P1, P2F=P2 and PCF=0. Otherwise, P1F=P2F=0 and PCF=the post-injection fuel quantity produced by the oxidation catalyst post-injection fuel map 348.

Figure 16:
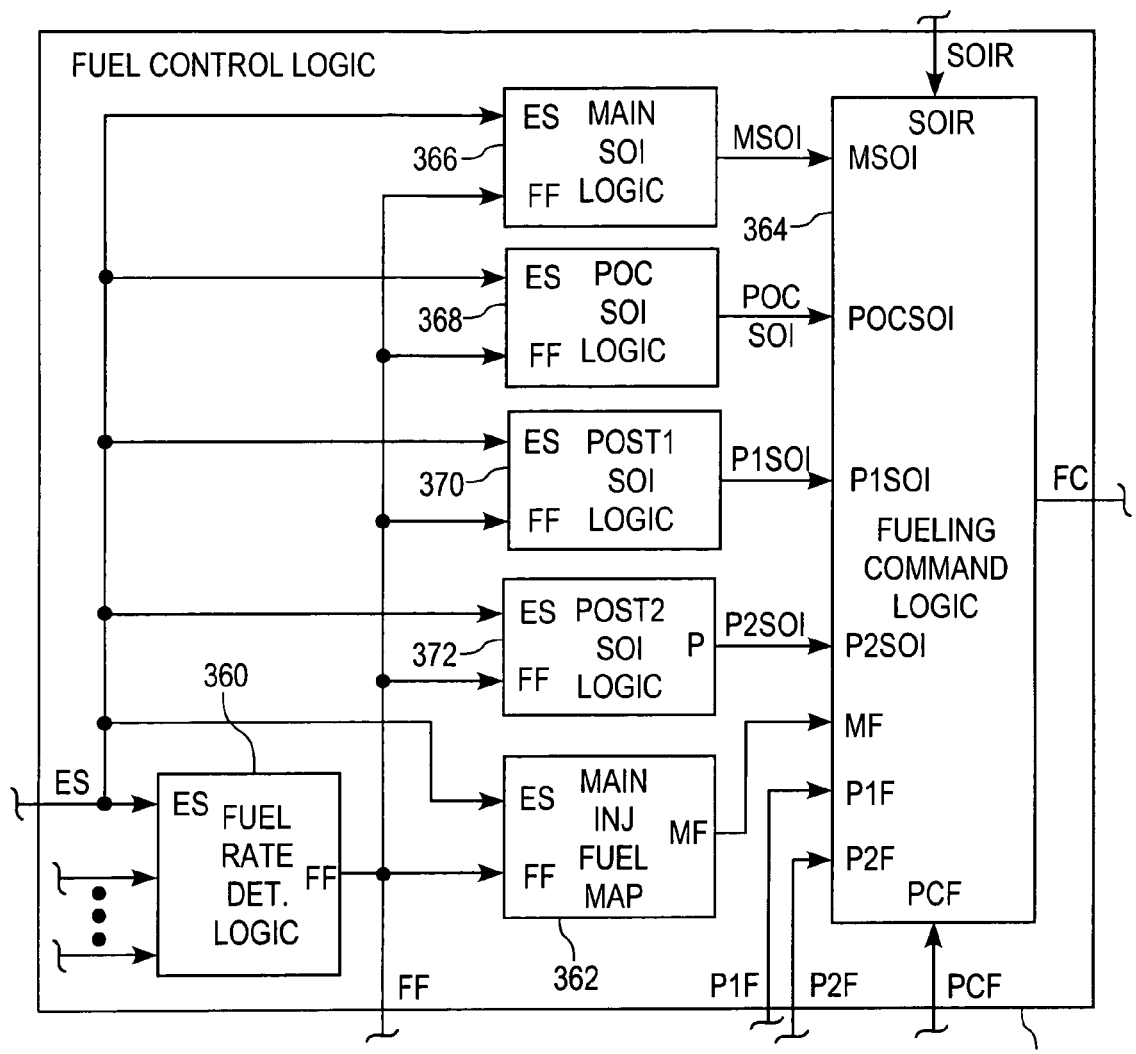
FIG. 16 is a block diagram of one illustrative embodiment of the fuel control logic block of FIG. 2.

Referring now to FIG. 16, a block diagram of one illustrative embodiment of the fuel control logic block 104 of FIG. 2 is shown. In the illustrated embodiment, the block 104 includes a fuel rate determination logic block 360 responsive to the engine speed signal, ES, as well as a number of other control signals and/or values, to produce the fuel flow value, FF, in a conventional manner as described hereinabove. The fuel flow value, FF, is supplied, along with the engine speed signal, ES, as inputs to a main injection fuel map block 362 producing as an output a main fuel flow value, MF. The main fuel flow value, MF, corresponds to a portion of the total fuel flow value, FF, that will be injected into the engine 12 for combustion in a conventional manner. The main fuel flow value, MF, generally will not include any pilot or pre-injection fueling, nor will it generally include any post-injection fueling. The main fuel flow value, MF, is provided to a main fuel, MF, input of a fueling command logic block 364 producing as its output the fueling command, FC. The above-described post-injection fuel flow values, P1F, P2F and PCF are also supplied to corresponding input of the fueling command logic block 104.

The fuel flow value, FF, and the engine speed signal, ES, are also provided as inputs to a number of start-of-injection logic blocks 366-372 for determining injection timing, or start-of-injection, of the various fuel pulsed relative to a reference point; e.g., reference crank angle or the like. In the illustrated embodiment, the fuel control logic block 104 includes a main start-of-injection logic block 366 producing as an output a main start-of-injection value, MSOI. The main start-of-injection logic block 366 is configured to map current values of fuel flow, engine speed and engine position; e.g., crank shaft angle relative to a reference crank angle, such as TDC, to a crank angle, typically in degrees relative to TDC, at which the main fuel flow value, MF, will be injected into the engine 12. The fuel control logic block 104 likewise includes a post oxidation catalyst start-of-injection logic block 368, a post1 start-of-injection logic block 370 and a post2 start-of-injection logic block 372 each operable as just described with respect to the logic block 366 to produce corresponding post oxidation catalyst start-of-injection, POCSOI, post1 start-of-injection, P1SOI, and post2 start-of-injection, P2SOI, values that are each provided to corresponding inputs of the fueling command logic block 364. The retarded start-of-injection value, SOIR, is also supplied as an input to the fueling command logic block 364.

Figure 17:
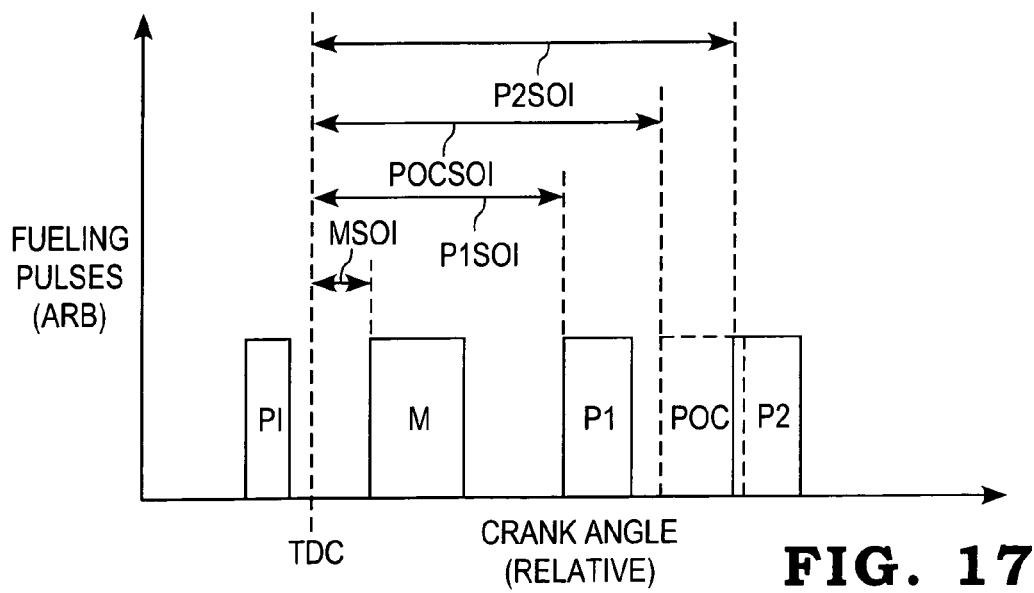
FIG. 17 is a diagram illustrating timing of various fuel pulses relative to a reference fuel timing point.

Referring now to FIG. 17, a plot of fueling pulses vs. crank angle provides an example illustration of the operation of the fueling command logic block 364 of FIG. 16. In particular, a main fuel pulse, M, which corresponds to MF, a first post-injection fuel pulse, P1, which corresponds to P1F, a second post-injection fuel pulse, P2, which corresponds to P2F, and an oxidation catalyst post-injection fuel pulse, POC, which corresponds to PCF, are shown. An additional fueling pulse, PI, is also illustrated in FIG. 17 and represents a pre-injection or so-called pilot injection pulse. It will be understood that such pre- or pilot injection pulses are conventional, as is any logic structure for generating any such fuel pulses, and such logic structure is accordingly omitted from FIG. 16 for brevity.

Also illustrated in FIG. 17 is a fuel injection timing reference point, which is provided in the form of a reference crank angle of top-dead-center (TDC). The timing of the various main and post-injection fuel pulses, M, P1, P2 and POC relative to TDC are also shown. In particular, MSOI identifies the crank angle, relative to TDC, at which the main fuel pulse, M, begins, as determined by the main SOI logic block 366. Likewise, P1SOI identifies the crank angle, relative to TDC, at which the first post-injection fuel pulse, P1, begins, as determined by the post1 SOI logic block 370, P2SOI identifies the crank angle, relative to TDC, at which the second post-injection fuel pulse, P2, begins, as determined by the post2 SOI logic block 372, and POCSOI identifies the crank angle, relative to TDC, at which the oxidation catalyst post-injection fuel pulse, POC, begins, as determined by the POC SOI logic block 368.

Referring again to FIGS. 12 and 15, and with the aid of FIG. 17, operation of the post-injection fuel quantity determination and supply step 144 of the algorithm 100 of FIG. 2 will now be recapped. If the catalyst inlet temperature, CIT, is less than or equal to the temperature threshold, $T_{TH}$, as illustrated in FIGS. 3 and 15, P1=P2=0, and POC and POCSOI will be determined as functions of fuel flow, FF, and engine speed, ES. $T_{TH}$ corresponds to a minimum exhaust gas temperature required by the oxidation catalyst 32 to raise the exhaust gas temperature, with the introduction of hydrocarbons into the exhaust gas stream, to a temperature range suitable for regenerating the aftertreatment component 34. If the catalyst inlet temperature, CIT, is less than this threshold temperature, $T_{TH}$, the algorithm 100 is operable as described hereinabove to reduce the exhaust flow through the exhaust gas conduits 28 and 30 by producing a VGT command adjustment value, VGTA, that adjusts the VGT command, VGTC, in a manner that reduces the flow of exhaust gas through the exhaust gas conduits 28 and 30. Additionally, the oxidation catalyst post-injection fuel quantity, POC, is injected at a crank angle difference of POCSOI relative to TDC so that it occurs near the end of combustion of the main fuel quantity, M, so that at least partial combustion of the oxidation catalyst post-injection fuel quantity, POC, causes the temperature of the exhaust gas produced by the engine 12 to increase. The oxidation catalyst post-injection fuel quantity, POC, is injected in this manner until the catalyst inlet temperature, CIT, rises above $T_{TH}$.

When the catalyst inlet temperature, CIT, is greater than the temperature threshold, $T_{TH}$, as illustrated in FIGS. 3 and 15, POC=0, and P1 P1F and P2=P2F, wherein P1F and P2F are determined by the post-injection fuel quantity determination logic block 144 of FIG. 4. P1SOI and P2SOI will be determined as functions of fuel flow, FF, and engine speed, ES as described with respect to FIG. 16. When the engine output torque, EOT, is below the torque threshold value, TH, as illustrated in FIG. 12, and is therefore within the region B, this indicates that regeneration of the aftertreatment component 34 is occurring at low engine output torque values. In this case, the first post-injection fuel quantity, POST1 or P1, is injected at a crank angle difference of P1SOI relative to TDC so that it occurs near the end of combustion of the main fuel pulse, MAIN or M, in order to increase the temperature of the exhaust gas to ensure more complete regeneration of the aftertreatment component 34. The second post-injection fuel pulse, POST2 or P2, is then injected at a crank angle difference of P2SOI relative to TDC so that it occurs after combustion of the main fuel pulse, MAIN or M, in order to generate appropriate quantities of hydrocarbons for regenerating the aftertreatment component 34.

Conversely, when the engine output torque, EOT, is above the torque threshold value, TH, as illustrated in FIG. 12, and is therefore within the region A, this indicates that regeneration of the aftertreatment component 34 is occurring at sufficiently engine output torque values to ensure adequate engine exhaust gas temperatures. In this case, the first post-injection fuel quantity, POST1 or P1, is omitted, and the second post-injection fuel pulse, POST2 or P2, is injected at a crank angle difference of P2SOI relative to TDC so that it occurs after combustion of the main fuel pulse, MAIN or M, in order to generate appropriate quantities of hydrocarbons for regenerating the aftertreatment component 34.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method for regenerating an exhaust gas aftertreatment component of an internal combustion engine, the method comprising:
    determining an output torque of the engine,
    if the output torque is greater than a torque threshold, supplying a single quantity of fuel to the engine after combustion of a main quantity of fuel and prior to combustion of a next main quantity of fuel,
    if the output torque is not greater than the torque threshold, supplying a first quantity of fuel to the engine near an end of combustion of the main quantity of fuel and prior to combustion of the next main quantity of fuel followed by supplying a second quantity of fuel after combustion of the main quantity of fuel and prior to combustion of the next main quantity of fuel,
    determining a temperature associated with the aftertreatment component,
    determining a fuel adjustment value as a function of the temperature associated with the aftertreatment component and a target regeneration temperature for the aftertreatment component, and
    adjusting the single quantity of fuel by the fuel adjustment value if the output torque is greater than the torque threshold, and otherwise adjusting at least the second quantity of fuel by the fuel adjustment value.

2. The method of claim 1 further including:
    determining an oxygen concentration of exhaust gas flowing through the aftertreatment component,
    determining a temperature adjustment value as a function of the oxygen concentration and a target oxygen concentration value, and
    adjusting the target regeneration temperature by the temperature adjustment value.

3. The method of claim 1 wherein adjusting at least the second quantity of fuel includes:
    adjusting the second quantity of fuel by the fuel adjustment value if the fuel adjustment value does not exceed a maximum fuel adjustment value, and
    adjusting the second quantity of fuel by the maximum fuel adjustment value and adjusting the first quantity of fuel by a difference between the fuel adjustment value and a maximum fuel adjustment value if the fuel adjustment value exceeds the maximum fuel adjustment value.

4. The method of claim 1 wherein determining a temperature associated with the aftertreatment component includes determining an operating temperature of the aftertreatment component.

5. The method of claim 1 wherein determining a temperature associated with the aftertreatment component includes determining a temperature of exhaust gas entering the aftertreatment component.

6. The method of claim 1 further including:
determining a pressure difference across the aftertreatment component,
determining a volumetric flow rate of exhaust gas through the aftertreatment component, and
determining the target regeneration temperature as a function of the pressure difference and the volumetric flow rate.

7. The method of claim 6 wherein determining a volumetric flow rate includes:
determining a mass flow rate of fresh air supplied to the engine,
determining a flow rate of fuel supplied to the engine,
determining a temperature of exhaust gas supplied to the aftertreatment component,
determining ambient pressure, and
computing the volumetric flow rate as a function of the pressure difference, the mass flow rate of fresh air, the flow rate of fuel, the temperature of exhaust gas supplied to the aftertreatment filter and the ambient pressure.

8. A method for regenerating an exhaust gas aftertreatment component of an internal combustion engine, the method comprising:
determining an output torque of the engine,
if the output torque is greater than a torque threshold, supplying a single quantity of fuel to the engine after combustion of a main quantity of fuel and prior to combustion of a next main quantity of fuel,
if the output torque is not greater than the torque threshold, supplying a first quantity of fuel to the engine near an end of combustion of the main quantity of fuel and prior to combustion of the next main quantity of fuel followed by supplying a second quantity of fuel after combustion of the main quantity of fuel and prior to combustion of the next main quantity of fuel,
determining a temperature of exhaust gas entering the aftertreatment component,
determining the output torque of the engine and supplying either of the single quantity of fuel and the first and second quantities of fuel to the engine only if the temperature of the exhaust gas entering the aftertreatment component is greater than a threshold temperature, and
if the temperature of the exhaust gas entering the aftertreatment component is not greater than the threshold temperature:
reducing a flow rate of the exhaust gas, and
supplying an auxiliary quantity of fuel to the engine near the end of combustion of the main quantity of fuel to increase the temperature of the exhaust gas entering the aftertreatment component.

9. A method for regenerating an exhaust gas aftertreatment component of an internal combustion engine, the method comprising:
determining first and second quantities of fuel to be supplied to the engine,
determining a fuel adjustment value,
determining a final second fuel quantity as the second quantity of fuel modified by the fuel adjustment value if the fuel adjustment value does not exceed a maximum adjustment value, and otherwise determining the final second fuel quantity as the maximum fuel adjustment value,
determining a final first fuel quantity as the first quantity of fuel if the fuel adjustment value does not exceed the maximum adjustment value, and otherwise determining the final first fuel quantity as the first quantity of fuel modified by a difference between the fuel adjustment value and the maximum adjustment value, and
supplying the first final fuel quantity to the engine near an end of combustion of a main quantity of fuel followed by supplying the second fuel quantity to the engine after combustion of the main quantity of fuel.

10. The method of claim 9 further including:
determining a flow rate of fuel to the engine, and
determining a rotational speed of the engine,
and wherein determining first and second quantities of fuel includes determining the first quantity of fuel as a first function of the flow rate of fuel and the rotational speed of the engine and determining the second quantity of fuel as a second function of the flow rate of fuel and the rotational speed of the engine.

11. The method of claim 10 wherein the first quantity of fuel is zero.

12. The method of claim 10 wherein determining a fuel adjustment value includes:
determining a temperature associated with the aftertreatment component, and
determining the fuel adjustment value as a function of the temperature associated with the aftertreatment component and a target regeneration temperature.

13. The method of claim 12 wherein determining a temperature associated with the aftertreatment component includes determining an operating temperature of the aftertreatment component.

14. The method of claim 13 wherein determining an operating temperature of the aftertreatment component includes:
determining a temperature of exhaust gas entering the aftertreatment component,
determining a temperature of exhaust gas exiting the aftertreatment component, and
determining the operating temperature of the aftertreatment component as a function of the temperature of exhaust gas entering the aftertreatment component and the temperature of exhaust gas exiting the aftertreatment component.

15. The method of claim 12 wherein determining a temperature associated with the aftertreatment component includes determining a temperature of exhaust gas entering the aftertreatment component.

16. The method of claim 12 further including:
determining an oxygen concentration of exhaust gas flowing through the aftertreatment component,
determining a temperature adjustment value as a function of the oxygen concentration and a target oxygen concentration value, and
modifying the target regeneration temperature by the temperature adjustment value.

17. The method of claim 12 further including:
determining a pressure difference across the aftertreatment component,
determining a volumetric flow rate of exhaust gas through the aftertreatment component, and determining the target regeneration temperature as a function of the pressure difference and the volumetric flow rate.

18. The method of claim 17 wherein determining a volumetric flow rate includes:
   determining a mass flow rate of fresh air supplied to the engine,
   determining a flow rate of fuel supplied to the engine,
   determining a temperature of exhaust gas supplied to the aftertreatment component,
   determining ambient pressure, and
   computing the volumetric flow rate as a function of the pressure difference, the mass flow rate of fresh air, the flow rate of fuel, the temperature of exhaust gas supplied to the aftertreatment filter and the ambient pressure.

19. The method of claim 9 wherein the engine includes an intake manifold, an exhaust manifold and an exhaust gas recirculation conduit fluidly coupled between the intake and exhaust manifolds,
   and further including inhibiting exhaust gas flow through the exhaust gas recirculation conduit before supplying either of the first and second final fuel quantities to the engine.

20. The method of claim 9 wherein the engine includes an intake conduit fluidly coupled between ambient and an intake manifold,
   and further including controlling air flow through the intake conduit before supplying either of the first and second final fuel quantities to the engine.

21. The method of claim 20 further including:
   determining a flow rate of fuel supplied to the engine, and
   determining a rotational speed of the engine,
   and wherein controlling air flow through the intake conduit includes reducing air flow through the intake conduit as a function of the flow rate of fuel supplied to the engine and the rotational speed of the engine.

22. The method of claim 9 further including:
   determining an output torque of the engine, and
   retarding a start-of-injection of fuel into the engine if the output torque is equal to a peak output torque value prior to supplying either of the first and second final fuel quantities to the engine.

23. The method of claim 9 further including:
   determining a flow rate of fuel supplied to the engine,
   determining a rotational speed of the engine,
   determining a start-of-injection crank angle relative to a reference crank angle as a function of the flow rate of fuel and the rotational speed of the engine,
   and supplying the first final fuel quantity to the engine at the start-of-injection crank angle.

24. The method of claim 9 further including:
   determining a flow rate of fuel supplied to the engine,
   determining a rotational speed of the engine,
   determining a start-of-injection crank angle relative to a reference crank angle as a function of the flow rate of fuel and the rotational speed of the engine,
   and supplying the second final fuel quantity to the engine at the start-of-injection crank angle.

25. The method of claim 9 further including:
   determining a flow rate of fuel supplied to the engine,
   determining a rotational speed of the engine,
   determining a first start-of-injection crank angle relative to a reference crank angle as a first function of the flow rate of fuel and the rotational speed of the engine,
   determining a second start-of-injection crank angle relative to the reference crank angle as a second function of the flow rate of fuel and the rotational speed of the engine,
   determining a main start-of-injection crank angle relative to the reference crank angle as a third function of the flow rate of fuel and the rotational speed of the engine,
   and supplying the main quantity of fuel at the main start-of-injection crank angle, followed by supplying the first quantity of fuel at the first start-of-injection crank angle, followed by supplying the second quantity of fuel at the second start-of-injection crank angle.

* * * * *